(12) United States Patent
Noro et al.

(10) Patent No.: US 10,832,088 B2
(45) Date of Patent: *Nov. 10, 2020

(54) INFORMATION SEARCH SYSTEM, INFORMATION SEARCH METHOD, AND INFORMATION SEARCH PROGRAM

(71) Applicant: EBA JAPAN CO., LTD., Minato-ku, Tokyo (JP)

(72) Inventors: Naoki Noro, Tokyo (JP); Yohei Takara, Tokyo (JP); Fuminori Ando, Tokyo (JP); Takahiro Fujimori, Tokyo (JP)

(73) Assignee: EBA JAPAN CO., LTD., Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 16/309,927

(22) PCT Filed: May 10, 2018

(86) PCT No.: PCT/JP2018/018219
§ 371 (c)(1),
(2) Date: Dec. 13, 2018

(87) PCT Pub. No.: WO2018/212078
PCT Pub. Date: Nov. 22, 2018

(65) Prior Publication Data
US 2019/0147294 A1 May 16, 2019

(30) Foreign Application Priority Data

May 17, 2017 (JP) .................................. 2017-098159
Mar. 27, 2018 (JP) .................................. 2018-060578

(51) Int. Cl.
*G01J 3/46* (2006.01)
*G01N 21/27* (2006.01)
(Continued)

(52) U.S. Cl.
CPC .............. *G06K 9/6227* (2013.01); *G01J 3/50* (2013.01); *G01N 21/27* (2013.01); *G06F 16/51* (2019.01);
(Continued)

(58) Field of Classification Search
CPC ...... G06T 2207/00; G06T 2207/10036; G06K 9/0063; G01J 3/00; G01J 3/28; G01J 3/46; G01N 21/27
See application file for complete search history.

(56) References Cited

U.S. PATENT DOCUMENTS 7,450,761 B2    11/2008  Portigal et al.
7,692,797 B2 *   4/2010  Kawahara ............ A61B 5/0066
                                                            356/497
(Continued)

FOREIGN PATENT DOCUMENTS

JP          2009505107 A      2/2009
JP          2009053064 A      3/2009
(Continued)

OTHER PUBLICATIONS

NPL Google Search; 2020; (Year: 2020).*
(Continued)

*Primary Examiner* — Luis Perez-Fuentes
(74) *Attorney, Agent, or Firm* — Holtz, Holtz & Volek PC

(57) ABSTRACT

An information search system for searching detection algorithm information of spectral data necessary for determining a target event from a photographed subject includes a first relational database configured to store, in advance, a first relevance index having at least three levels between each target event of the subject and the detection algorithm information, a target event input unit configured to receive input information regarding a target event of the subject to be newly determined, and a search unit configured to search
(Continued)

at least one piece of detection algorithm information on the basis of information regarding the target event received by the target event input unit by referencing the first relevance index stored in the first relational database.

23 Claims, 20 Drawing Sheets

(51) Int. Cl.
| | |
|---|---|
| G06K 9/62 | (2006.01) |
| G06K 9/20 | (2006.01) |
| H04N 5/33 | (2006.01) |
| G06F 16/51 | (2019.01) |
| G06F 16/583 | (2019.01) |
| G06K 9/60 | (2006.01) |
| G01J 3/50 | (2006.01) |
| G06K 9/00 | (2006.01) |
| H04N 5/232 | (2006.01) |
| G01J 3/36 | (2006.01) |

(52) U.S. Cl.
CPC ....... *G06F 16/583* (2019.01); *G06K 9/00496* (2013.01); *G06K 9/209* (2013.01); *G06K 9/60* (2013.01); *H04N 5/232* (2013.01); *H04N 5/332* (2013.01); *G01J 3/36* (2013.01)

(56) References Cited

U.S. PATENT DOCUMENTS

| | | | | |
|---|---|---|---|---|
| 8,295,578 | B2* | 10/2012 | Lundgren | G01N 21/314 |
| | | | | 382/141 |
| 8,416,337 | B2 | 4/2013 | Ishigami et al. | |
| 2005/0122513 | A1* | 6/2005 | Masten | A01M 7/0089 |
| | | | | 356/328 |
| 2007/0043527 | A1 | 2/2007 | Quan et al. | |
| 2008/0123097 | A1* | 5/2008 | Muhammed | G01J 3/0218 |
| | | | | 356/419 |
| 2010/0201800 | A1 | 8/2010 | Yamamoto et al. | |
| 2011/0273558 | A1* | 11/2011 | Subbiah | G01J 3/02 |
| | | | | 348/89 |
| 2012/0081546 | A1 | 4/2012 | Matsumoto | |
| 2012/0200682 | A1* | 8/2012 | Mestha | G06K 9/0063 |
| | | | | 348/61 |
| 2013/0077958 | A1* | 3/2013 | Xu | G03B 11/00 |
| | | | | 396/544 |
| 2013/0286396 | A1 | 10/2013 | Matsumoto | |
| 2014/0163391 | A1 | 6/2014 | Koizumi et al. | |
| 2014/0350395 | A1 | 11/2014 | Shachaf et al. | |
| 2016/0150213 | A1* | 5/2016 | Mutti | G06K 9/4604 |
| | | | | 348/143 |
| 2019/0147294 | A1* | 5/2019 | Noro | G01N 21/27 |
| | | | | 348/161 |
| 2020/0065326 | A1* | 2/2020 | Noro | G01J 3/46 |

FOREIGN PATENT DOCUMENTS

| | | |
|---|---|---|
| JP | 2010185719 A | 8/2010 |
| JP | 2011095225 A | 5/2011 |
| JP | 2012078156 A | 4/2012 |
| JP | 2015505051 A | 2/2015 |
| JP | 2015166682 A | 9/2015 |
| JP | 2017003495 A | 1/2017 |
| WO | 2012090416 A1 | 7/2012 |
| WO | 2013002350 A1 | 1/2013 |

OTHER PUBLICATIONS

Multispectral photography for earth resources; 1972; (Year: 1972).*
Multispectral imaging, image processing and classification for agriculture; Lobo; 2000; (Year: 2000).*
International Search Report (ISR) dated Jul. 24, 2018 issued in International Application No. PCT/JP2018/018219.
Written Opinion dated Jul. 24, 2018 issued in International Application No. PCT/JP2018/018219.
Anna Dankowska, "Detection of plant oil addition to cheese by synchronous fluorescence spectroscopy," Dairy Science & Technology, Mar. 15, 2015, vol. 95, pp. 413-424.
Fulin Luo, et al., "Semisupervised Sparse Manifold Discriminative Analysis for Feature Extraction of Hyperspectral Images," IEEE Transactions on Geoscience and Remote Sensing, vol. 54, No. 10, Oct. 2016, pp. 6197-6211.
Related U.S. Appl. No. 16/309,921; Title: Information Search System and Information Search Program; First Named Inventor: Naoki Noro; filed Dec. 13, 2019.
Notice of Allowance dated Jul. 29, 2020 issued in related U.S. Appl. No. 16/309,921.

* cited by examiner

FIG. 16

| REFERENCE DETECTION ALGORITHM INFORMATION, REFERENCE PHOTOGRAPHING CONDITION | | PHOTOGRAPHING CONDITION TO BE SEARCHED | |
|---|---|---|---|
| 1) 880 ± 5 nm, 970 ± 10 nm CLUSTER ANALYSIS | ⎫ 80% →  | WHITE BALANCE XX | |
| 2) 230 ± 12 nm, 630 ± 5 nm | ⎭ 20% ↘ | LENS ARRANGEMENT P, FILTER W | |
|  |  | FILTER Q | |
| 3) 547 ± 4 nm, 275 ± 12 nm PLS REGRESSION, SHUTTER SPEED XX seconds | ⎫ 60% → | FILTER R, ILLUMINATION LIGHT ANGLE XX° | ⎫ |
| 4) IMAGE CAPTURING ELEMENT T, SHUTTER SPEED XX seconds | ⎬ 20% ↗ | FILTER S, SPATIAL RESOLUTION 133 to 140 dpi | ⎬ SECOND RELEVANCE INDEX |
| 5) 455 ± 12 nm | ⎭ 20% ↗ | EXPOSURE TIME OF XX ns OR LONGER | ⎬ |
|  |  | EXPOSURE TIME SHORTER THAN XX ns | ⎭ |

FIG. 18

| | PHOTOGRAPHING CONDITION TO BE SEARCHED | | | | | | |
|---|---|---|---|---|---|---|---|
| REFERENCE DETECTION ALGORITHM INFORMATION, REFERENCE PHOTOGRAPHING CONDITION | WHITE BALANCE XX | LENS ARRANGEMENT P, FILTER W | IMAGE CAPTURING ELEMENT T | IMAGE CAPTURING ELEMENT U, ILLUMINATION LIGHT ANGLE XX° | IMAGE CAPTURING ELEMENT W, SPATIAL RESOLUTION 133 to 140 dpi | EXPOSURE TIME OF XX ns OR LONGER | EXPOSURE TIME SHORTER THAN XX ns |
| 880 ± 5 nm, 970 ± 10 nm CLUSTER ANALYSIS | 80% | | 20% | | | | |
| 230 ± 12 nm, 630 ± 5 nm | 40% | 100% | | 60% | | | |
| 547 ± 4 nm, 275 ± 12 nm PLS REGRESSION, SHUTTER SPEED XX seconds | | | 80% | | 20% | | |
| FILTER S, SHUTTER SPEED XX seconds | | | | | | | 40% |
| FILTER R | | | | 100% | | 20% | |

SECOND RELEVANCE INDEX

10,832,088 B2

INFORMATION SEARCH SYSTEM, INFORMATION SEARCH METHOD, AND INFORMATION SEARCH PROGRAM

TECHNICAL FIELD

The present invention relates to an information search system, an information search method, and an information search program suitable for automatically searching detection algorithm information for acquiring spectral data necessary for determining a target event from a subject or various photographing conditions of a photographing apparatus that photographs the subject.

BACKGROUND ART

In the prior art, a spectral image capturing device capable of determining a desired event in a subject by spectrometrically analyzing a photographic image of a subject on a wavelength basis has been proposed. The spectral image capturing device can acquire high wavelength resolution spectrometric information (hereinafter, referred to as "hyperspectral data") across several tens of wavelength regions from an ultraviolet wavelength range to a visible wavelength range, and further to an infrared wavelength range with a wavelength resolution of 0.1 nm to 100 nm. By utilizing such hyperspectral data, it is possible to analyze, for example, freshness of foods, defects of building structures, photosynthesis of plants, chemical elements contained in minerals, moisture or spots of skin, and the like with high precision. That is, using the spectral image capturing device, it is possible to not only simply photograph a subject but also detect a target event in the subject.

Examples of the spectral image capturing device capable of acquiring the hyperspectral data are disclosed, for example, in Patent Documents 1 and 2.

Patent Document 1 discusses a spectral image capturing device in which a tumor region in a human organism is set as a target event. In this technique of Patent Document 1, a tumor region and a non-tumor region are distinguished by detecting an element deposited in a cancer cell by focusing on a fluorescent wavelength.

Patent Document 2 discusses an information processing apparatus for determining whether or not a subject is a fruit. It is determined whether or not a subject is a fruit by acquiring a reference characteristic amount of the fruit in advance and comparing it with a characteristic amount of a spectral image of the subject actually photographed. All of the reference characteristic amounts are based on spectral data.

In addition, a technique focusing on an image analysis of the hyperspectral data has been also discussed (for example, see Patent Document 3).

CITATION LIST

Patent Documents

Patent Document 1: PCT International Publication No. WO2013/002350

Patent Document 2: JP-A-2017-3495

Patent Document 3: JP-A-2015-166682

SUMMARY OF INVENTION

Technical Problem

However, it takes a lot of time and labor to research the detection algorithm for acquiring the spectral data necessary for determining a target event in a subject. This also requires technical knowledge.

For example, in the detection algorithm for obtaining spectral data on a tumor region in a human organism described above, a detection algorithm capable of detecting the fluorescence is organized by focusing on a fact that protoporphyrin IX accumulated in a cancer cell emits fluorescence at a wavelength of 635 nm, and photoprotoporphyrin emits fluorescence at a wavelength of 675 nm. In order to organize such a detection algorithm, it is necessary to know technical knowledge such as what element is accumulated in the cancer cell, or what wavelength the fluorescence emits, or the like. In addition, it takes a lot of time and labor to make various studies for precisely extracting only the fluorescence and accurately determine it.

For this reason, a technology capable of easily acquiring an optimum detection algorithm whenever a new target event is sequentially generated in the subject was demanded in the prior art. However, Patent Documents 1 to 3 fail to discuss a technology for acquiring an optimum detection algorithm depending on the target event of the subject.

It is also necessary to reduce a development cost or period by automatically searching a condition for designing an image capturing device for actually imaging a subject or a condition for photographing a subject (hereinafter, collectively referred to as a "photographing condition"). However, Patent Documents 1 to 3 fail to discuss a technology capable of satisfying such a demand.

In view of the aforementioned problems, it is therefore an object of the invention to provide an information search system, an information search method, and an information search program capable of automatically searching detection algorithm information for acquiring spectral data necessary for determining a target event from a subject and a photographing condition of a photographing apparatus that photographs the subject.

Solution to Problem

In order to address the aforementioned problems, the inventors invented an information search system, an information search method, and information search program for searching detection algorithm information necessary for determining a target event from a photographed subject, in which input information regarding a target event of a subject to be determined is received, and one or more pieces of detection algorithm information are searched on the basis of information regarding the input target event by referencing the first relevance index having three or more levels between each target event of the subject and the detection algorithm information stored in a first relational database.

According to the present invention, there is provided an information search system for searching detection algorithm information of spectral data necessary for determining a target event from a photographed subject, the information search system including: a first relational database configured to store a first relevance index having three or more levels between each target event of the subject and the detection algorithm information in advance; target event input means configured to receive information regarding a target event of the subject to be newly determined; and search means configured to search one or more pieces of detection algorithm information on the basis of information regarding the target event received by the target event input means by referencing the first relevance index stored in the first relational database.

According to the present invention, there is provided an information search system for searching a photographing condition of a photographing apparatus for determining a target event from a photographed subject, the information search system including: a first relational database configured to store, in advance, a first relevance index having three or more levels between each target event of the subject and each photographing condition; target event input means configured to receive information regarding a target event of the subject to be newly determined; and search means configured to search one or more photographing conditions on the basis of information regarding the target event received by the target event input means by referencing the first relevance index stored in the first relational database.

According to the present invention, there is provided an information search program for searching detection algorithm information necessary for determining a target event from a photographed subject, the information search program causing a computer to execute: a target event input step of receiving an input of information regarding a target event of a subject to be newly determined; and a search step of searching one or more pieces of detection algorithm information on the basis of information regarding the target event input through the target event input step by referencing a first relevance index having three or more levels between each target event of the subject and the detection algorithm information stored in a first relational database.

According to the present invention, there is provided an information search program for searching a photographing condition of a photographing apparatus for determining a target event from a photographed subject, the information search program causing a computer to execute: a target event input step of receiving input information regarding a target event of a subject to be newly determined; and a search step of searching one or more photographing conditions on the basis of information regarding the target event input through the target event input step by referencing a first relevance index having three or more levels between each target event of the subject and each photographing condition stored in a first relational database.

According to the present invention, there is provided an information search method for searching detection algorithm information necessary for determining a target event from a photographed subject, the information search method including: a target event input step of receiving an input of information regarding a target event of a subject to be newly determined; and a search step of searching one or more pieces of detection algorithm information on the basis of information regarding the target event input through the target event input step by referencing a first relevance index having three or more levels between each target event of the subject and the detection algorithm information stored in a first relational database. Each of the steps is executed by a computer.

According to the present invention, there is provided an information search method for searching a photographing condition of a photographing apparatus for determining a target event from a photographed subject, the information search method including: a target event input step of receiving input information regarding a target event of a subject to be newly determined; and a search step of searching one or more photographing conditions on the basis of information regarding the target event input through the target event input step by referencing a first relevance index having three or more levels between each target event of the subject and each photographing condition stored in a first relational database. Each of the steps is executed by a computer.

Advantageous Effects of Invention

According to the present invention having the aforementioned configuration, it is possible to easily acquire optimum detection algorithm information of the spectral data depending on a target event of the subject to be determined therefrom. For this reason, it is possible to reduce a burden of labor for researching the optimum detection algorithm and shorten time whenever a new target event of the subject is sequentially generated.

BRIEF DESCRIPTION OF DRAWINGS

FIG. 16 is a diagram for describing another example of the second relevance index;

FIG. 18 is a diagram illustrating an example in which a filter condition is defined in the reference detection algorithm information of the left side, and an image capturing element condition is defined in the photographing condition of the right side;

DESCRIPTION OF EMBODIMENTS

An information search system according to the present invention will now be described in details with reference to the accompanying drawings.

First Embodiment

Figure 1:
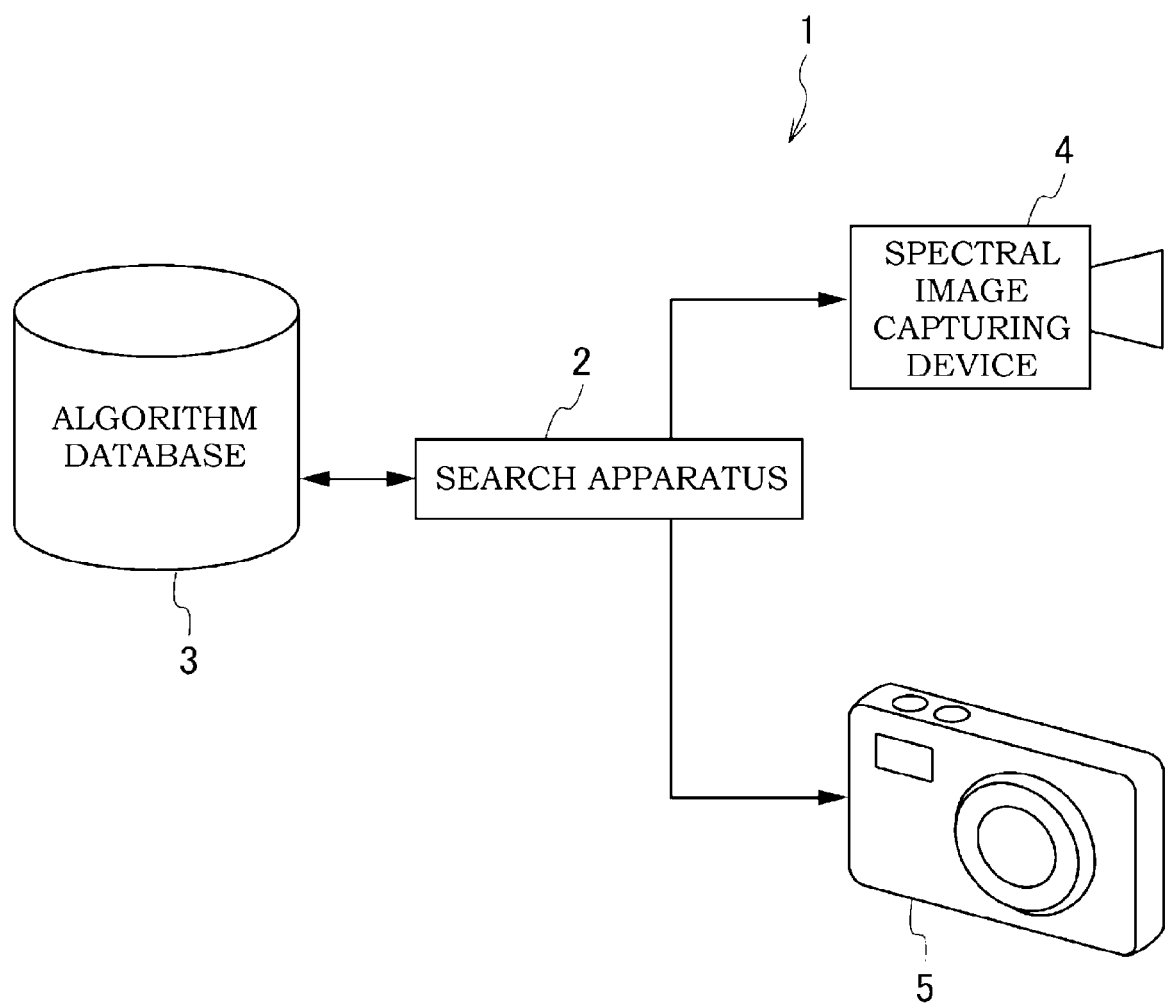
FIG. 1 is a block diagram illustrating a general configuration of an information search system according to a first embodiment of the invention.

FIG. 1 is a block diagram illustrating a general configuration of the information search system 1 according to the first embodiment of the invention. The information search system 1 is to search detection algorithm information to be provided to a spectral image capturing device 4. The information search system 1 includes an algorithm database 3, a search apparatus 2 connected to the algorithm database, and a spectral image capturing device 4 and a photographing apparatus 5 connected to the search apparatus 2.

The algorithm database 3 has a database built to provide the detection algorithm information to the spectral image capturing device 4. In addition, the algorithm database 3 has a database regarding a photographing condition of the photographing apparatus 5. In this algorithm database 3, information transmitted via a public communication network or information input by a user of the system is accumulated. Furthermore, the algorithm database 3 transmits the accumulated information to the search apparatus 2 in response to a request from the search apparatus 2.

The search apparatus 2 is an electronic device such as a personal computer (PC). Alternatively, the search apparatus 2 may be implemented using any other electronic devices such as a mobile phone, a smart phone, a tablet terminal, or a wearable terminal instead of the PC.

Figure 2:
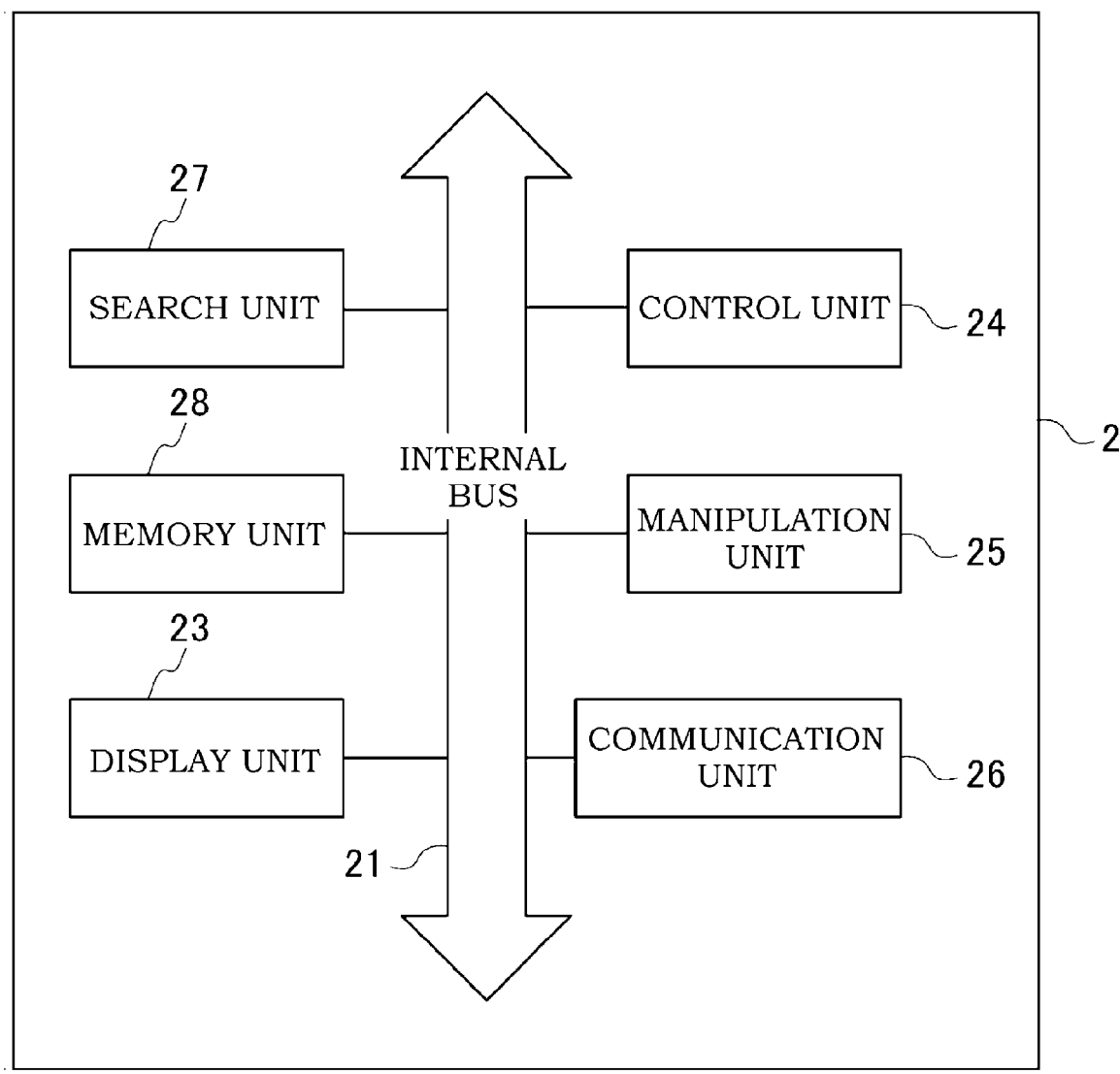
FIG. 2 is a block diagram illustrating a search apparatus of the information search system.

FIG. 2 is an exemplary specific configuration of the search apparatus 2. The search apparatus 2 includes a control unit 24 for controlling the entire search apparatus 2, a manipulation unit 25 for inputting various control instructions using a manipulation button, a keyboard, or the like, a communication unit 26 for performing wired communication or radio communication, a search unit 27 that searches optimum detection algorithm information, and a memory unit 28 such as a hard disk that stores a program for executing the search. They are connected to each other via an internal bus 21. In addition, a display unit 23 as a monitor for actually displaying information is connected to the internal bus 21.

The control unit 24 is a so-called central control unit for controlling each element embedded in the search apparatus 2 by transmitting a control signal via the internal bus 21. In addition, the control unit 24 transmits various control instructions via the internal bus 21 in response to a manipulation on the manipulation unit 25.

The manipulation unit 25 is implemented using a keyboard or a touch panel and receives an execution command for executing the program from a user. When the execution command is received from a user, the manipulation unit 25 notifies it to the control unit 24. The notified control unit 24 activates the search unit 27 and allows each element to cooperate with each other to executing a desired processing operation.

The search unit 27 searches detection algorithm information of spectral data necessary for determining a target event from the subject photographed by the spectral image capturing device 4. The search unit 27 reads various types of information stored in the memory unit 28 or various types of information stored in the algorithm database as information necessary for executing the search operation. The search unit 27 may be controlled by artificial intelligence. The artificial intelligence may be based on any artificial intelligence technique known in the art.

The display unit 23 has a graphic controller that creates a display image under control of the control unit 24. The display unit 23 includes, for example, a liquid crystal display (LCD) or the like.

Under control of the control unit 24, predetermined information is written to or read from each address of the memory unit 28 such a hard disk as necessary. In addition, the memory unit 28 stores a program for executing the present invention. The program is read and executed by the control unit 24.

Figure 3:
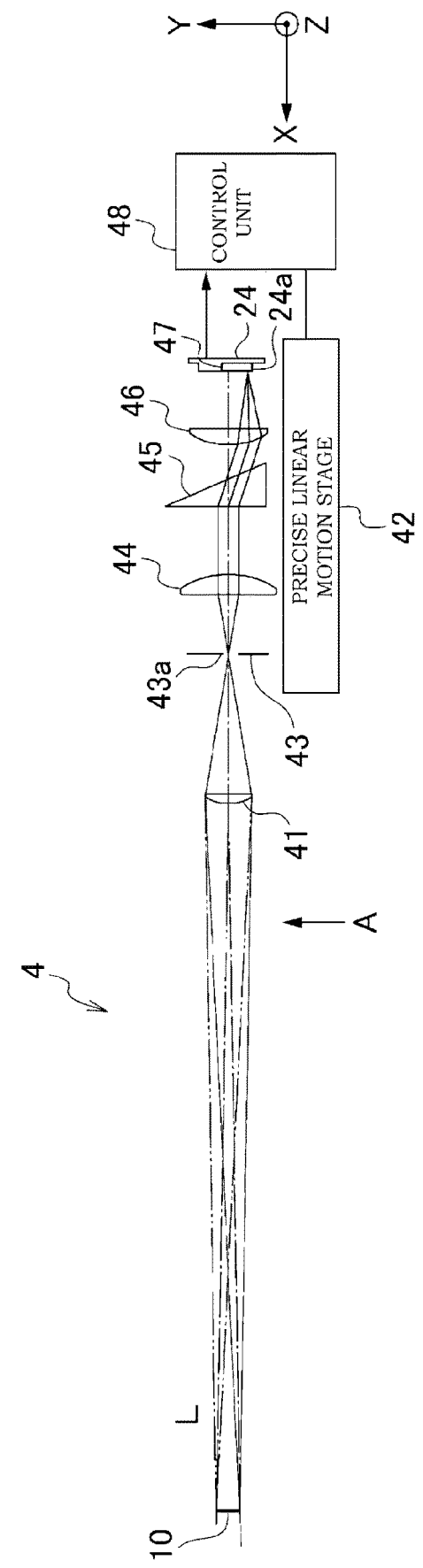
FIG. 3 is a block diagram illustrating a spectral image capturing device of the information search system.

FIG. 3 illustrates an exemplary configuration of the spectral image capturing device 4. The spectral image capturing device 4 includes a so-called multispectral camera, a color filter exchangeable camera, or a prism type camera. The spectral image capturing device 4 photographs a subject and acquires a spectral image therefrom. The spectral image capturing device 4 creates a spectral image on the basis of three-dimensional spectral data having two-dimensional spatial information from the two-dimensional spectral data in each photographing location and one-dimensional wavelength information. The spectral image created by the spectral image capturing device 4 includes a plurality of two-dimensional images representing reflectance or transmittance of the subject for each wavelength. An example of the spectral image may have a wavelength resolution of 0.1 nm to 100 nm within a wavelength region having a predetermined wavelength range of 200 nm to 13 μm, so that spectral images are created for each band.

Note that the wavelength range in the spectral image photographed by the spectral image capturing device 4 includes an infrared range, a near-infrared range, and an ultraviolet range as well as the visible light range.

The spectral image capturing device 4 includes an objective lens 41 that captures light emitted from a photographic target by itself or light reflecting on or transmitting through the subject 10, that is, photographic light L from the subject 10, a precise linear motion stage 42 that moves in a Y-axis direction on a Cartesian coordinate system having X, Y, and Z axes, a slit plate 43 for arranging a slit opening 43a provided in the Z-axis direction on an image plane of the objective lens 41, a collimator lens 44 for collimating light beams transmitting through the slit opening 43a, an dispersive optical element 45 that disperses the collimated light from the collimator lens 44, a imaging lens 46 that captures the light beams emitted from the dispersive optical element 45, an image capturing element 47 provided on the image plane of the imaging lens 46, and a control unit 48 that controls the precise linear motion stage 42 and the image capturing element 47 to perform various processings for the image data received through the image capturing element 47. Note that the spectral image capturing device 4 may be provided using the technique disclosed in JP-A-2015-166682.

The precise linear motion stage 42 integrally shifts the slit plate 43, the collimator lens 44, the dispersive optical element 45, the imaging lens 46, and the image capturing element 47 along the Y-axis direction under control of the control unit 48.

The dispersive optical element 45 is implemented, for example, using diffraction gratings, a prism, and the like. The dispersive optical element has a function of dispersing the light beams passing through the collimator lens 44 on a wavelength component basis.

The image capturing element 47 includes, for example, a CCD image sensor, a CMOS image sensor, or the like. The image capturing element 47 converts the light focused on the image plane into an electrical signal through optoelectric conversion. In addition, the electric signal converted by the image capturing element 47 is transmitted to the control unit 48. A suitable image capturing element 47 is arranged to match infrared, near-infrared, or ultraviolet light depending on the received light.

Figure 4:
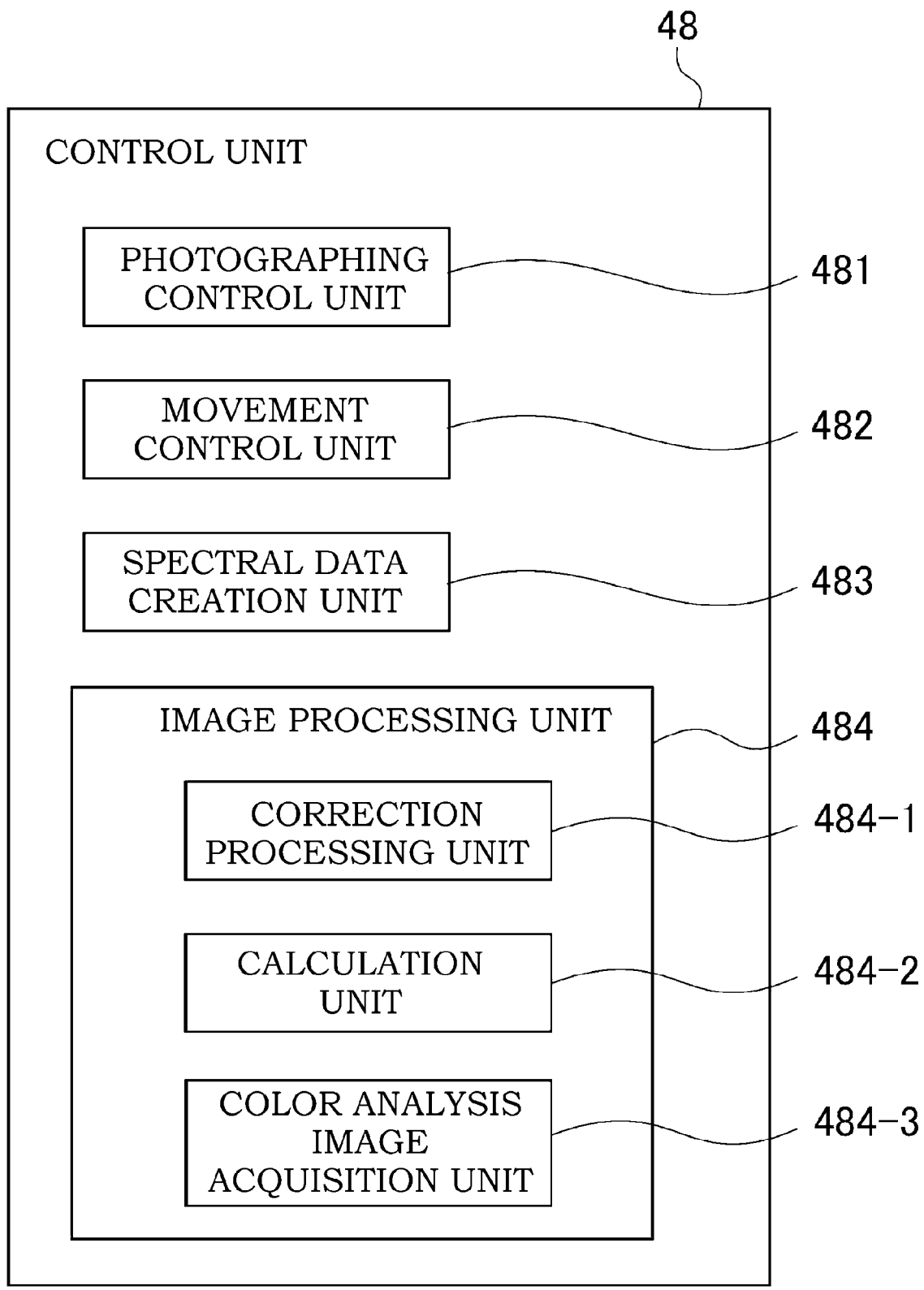
FIG. 4 is a diagram for describing a detailed configuration of a control unit of the spectral image capturing device.

FIG. 4 illustrates a configuration of the control unit 48 in more details. The control unit 48 includes a photographing control unit 481 that controls a timing for acquiring the electric signal in the image capturing element 47, a movement control unit 482 that controls a shift direction, a shift amount, and a shift timing of the precise linear motion stage 42 along the Y-axis direction, a spectral data creation unit 483 that creates spectral data on the basis of the electric signal from the image capturing element 47, and an image processing unit 484 that performs various image processings or corrections on the basis of the spectral data created by the spectral data creation unit 483. Note that a part or all of the elements of the control unit 48 may also be embedded in an independent personal computer (PC).

The spectral data creation unit 483 creates two-dimensional spectral data having one-dimensional spatial information and one-dimensional wavelength information on the basis of the electric signal transmitted from the image capturing element 47 and stores them. By repeatedly executing this processing, the spectral data creation unit 483 can obtain a hyperspectral image consisting of three-dimensional spectral data including two-dimensional spatial information and one-dimensional wavelength information as the photographing operation is completed for all the photographing locations.

The image processing unit 484 converts the wavelength-based spectral image created by the spectral data creation unit 483 into a predetermined color system and performs a color operation process in order to create a color analysis image. In addition, the image processing unit 484 performs a processing for displaying the created color analysis image on the basis of a predetermined display method. The image processing unit 484 includes a correction processing unit 484-1, a calculation unit 484-2, and a color analysis image acquisition unit 484-3.

The correction processing unit 484-1 performs rejection of noise caused by dark currents, correction of pixel-to-pixel sensitivity difference, luminance correction, correction of unevenness of light source illumination in a space, and the like.

The calculation unit 484-2 calculates each spectral radiance, each spectral luminance and the like of each wavelength-based spectral image processed by the correction processing unit 484-1.

The color analysis image acquisition unit 484-3 performs color space conversion for converting the spectral image into a color system satisfying a standard set using various parameters corrected by the correction processing unit 484-1, and each spectral radiance and each spectral luminance calculated by the calculation unit 484-2, and the like.

In the color analysis image acquisition unit 484-3, the color analysis image subjected to the color space conversion is transmitted to a PC or the like (not shown) and is visualized on a display or the like.

Figure 5:
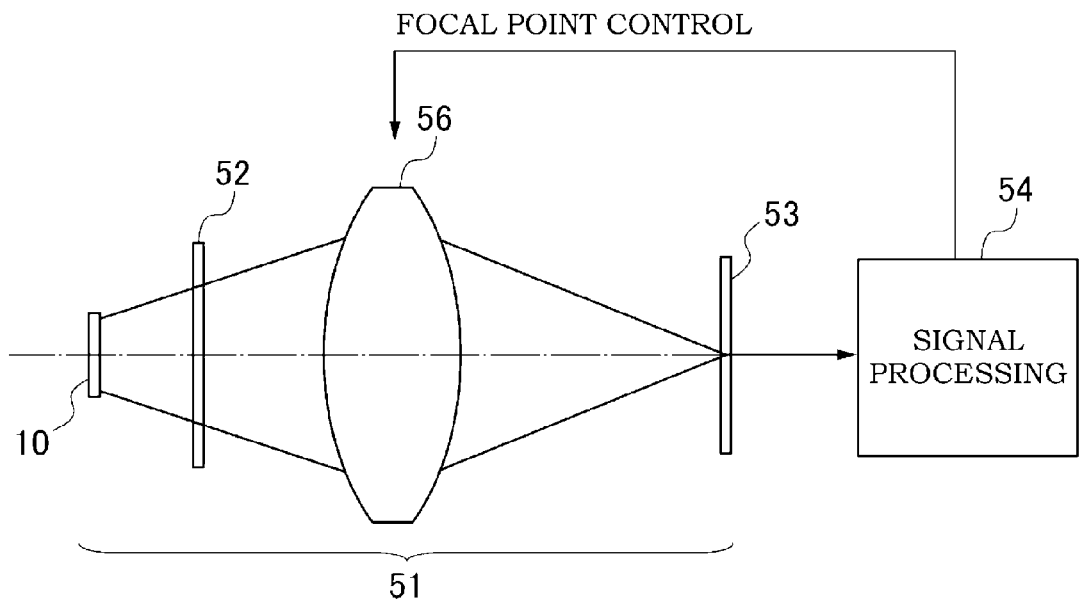
FIG. 5 is a diagram illustrating an exemplary block configuration of a photographing apparatus.

FIG. 5 illustrates an exemplary block configuration of the photographing apparatus 5. The photographing apparatus 5 includes a typical digital camera, a multispectral camera, or any type of digital camera mounted on a mobile phone, a smart phone, a tablet terminal, and a wearable terminal. While the spectral image capturing device 4 can detect spectral data of all wavelength ranges, the photographing apparatus 5 is intended to limitatively detect spectral data of a particular wavelength region set in advance in addition to image photographing for a typical visible range. The photographing apparatus 5 includes an imaging optical system 51, a filter 52, an image capturing element 53, and a signal processing unit 54.

The imaging optical system 51 has at least one image capturing lens 56 to condense the light from the subject 10 to form an image on an image plane of the image capturing element 53.

The filter 52 is arranged between the subject 10 and the image capturing lens 56. The filter 52 is arranged in the middle of an optical path to the image capturing element 53. The filter 52 is an element having a predetermined spectral transmittance. That is, the filter 52 transmits only the light belonging to a predetermined wavelength region and reflects the light of other wavelength regions. The type of the filter 52 is selected depending on a wavelength of the light to be transmitted in practice and a wavelength bandwidth. Although the filter 52 is assumed to be fixed in advance in the photographing apparatus 5 in this example, the invention is not limited thereto. That is, the filter 52 may be configured such that a plurality of filters 52 having different transmission wavelength regions are sequentially switchable.

The image capturing element 53 includes a CCD image sensor, a CMOS image sensor, or the like. The image capturing element 53 converts the light focused on an image plane into an electric signal through photoelectric conversion. In addition, the electric signal converted by the image capturing element 53 is transmitted to the signal processing unit 54.

The signal processing unit 54 is a circuit for processing the electric signal transmitted from the image capturing element 53. The signal processing unit 54 creates a spectral separation image separated for each wavelength region of the light from the subject 10 on the basis of the image acquired by the image capturing element 53. In addition, the signal processing unit 54 may perform various focal point control operations on the basis of the acquired electric signal.

Operations of the information search system 1 having the aforementioned configuration according to the first embodiment will now be described.

First, the search apparatus 2 searches detection algorithm information to be provided to the spectral image capturing device 4 or the photographing apparatus 5 or detection algorithm information to be provided to the photographing apparatus 5. This search process starts as a user inputs a target event of a subject to be newly photographed by the spectral image capturing device 4 or the photographing apparatus 5. Here, the "subject" is a generic term referring to an object actually photographed by the spectral image capturing device 4 or the photographing apparatus 5, and the "target event" refers to an object or work to be determined using the spectral image capturing device 4 or the photographing apparatus 5. For example, assuming that it is desired to determine only salt from a mixture of salt and sugar, the subject is the mixture, and the target event is the salt. For example, assuming that it is desired to determine only oil from a mixture of water and oil, the subject is the mixture, and the target event is the oil. For example, assuming that it is desired to determine freshness of sushi, the subject is the sushi, and the target event is the freshness. For example, assuming that it is desired to determine a spot on a face, the subject is the face, and the target event is the spot. For example, assuming that it is desired to determine a stomach cancer from a stomach, the subject is the stomach, and the target event is the stomach cancer.

A user manually inputs a target event of a subject using the manipulation unit 25. In this input operation, text data regarding the target event of the subject created by another electronic device such as a mobile terminal or a PC may also be input via the Internet.

The target event of the subject transmitted or input in this manner is stored in the memory unit 28.

Figure 6:
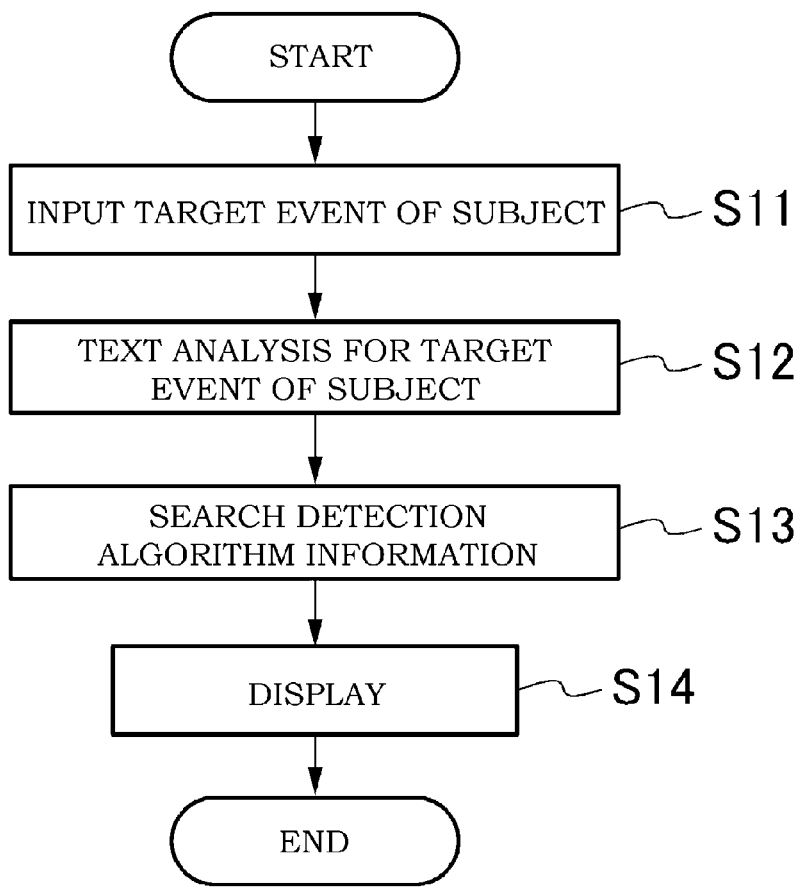
FIG. 6 is a flowchart illustrating a processing operation sequence of an information search program.

After the target event of the subject is input in this manner, the processing operation using the information search program is executed in practice. A processing operation flow of the information search program is illustrated in FIG. 6.

The information search program performs a text analysis for the target event of the subject input in step S11 and stored in the memory unit 28 (step S12). In this text analysis, any one of existing techniques such as a text mining technique, a data mining technique, and a language analysis processing technique may be employed.

Then, the information search program extracts a character string over one or more units out of all grammatical structural units such as words, morphemes, phrases, and clauses from the target event of the subject to be analyzed. For example, assuming that text data "leg blood vessel" is input as the target event of the subject, character strings "leg" and "blood vessel" are extracted. For example, assuming that text data "facial moisture" is input, character strings "face" and "moisture" are extracted. The information search program specifies the subject and the target event from the extracted character strings. In the aforementioned example, "leg" and "face" are extracted as the subject, and "blood vessel" and "moisture" are extracted as the target event. Typically, a character string of a subject is located before a character string of the target event in many cases. Therefore, the subject and the target event are specified starting from the head of the extracted character string.

Alternatively, a user may separately input the subject and the target event in advance, for example, by setting "leg" as the subject and setting "blood vessel" as the target event. In this case, the input character strings of the subject and the target event are directly received.

Then, the information search program advances to step S13 and searches detection algorithm information having a high relevance index with the character string extracted in step S12. Before this search operation, the algorithm database 3 acquires, in advance, a target event for reference (hereinafter, referred to as "reference target event") and a relevance index having three or more levels of the detection algorithm information having two or more classifications (hereinafter, referred to as "first relevance index").

Figure 7:
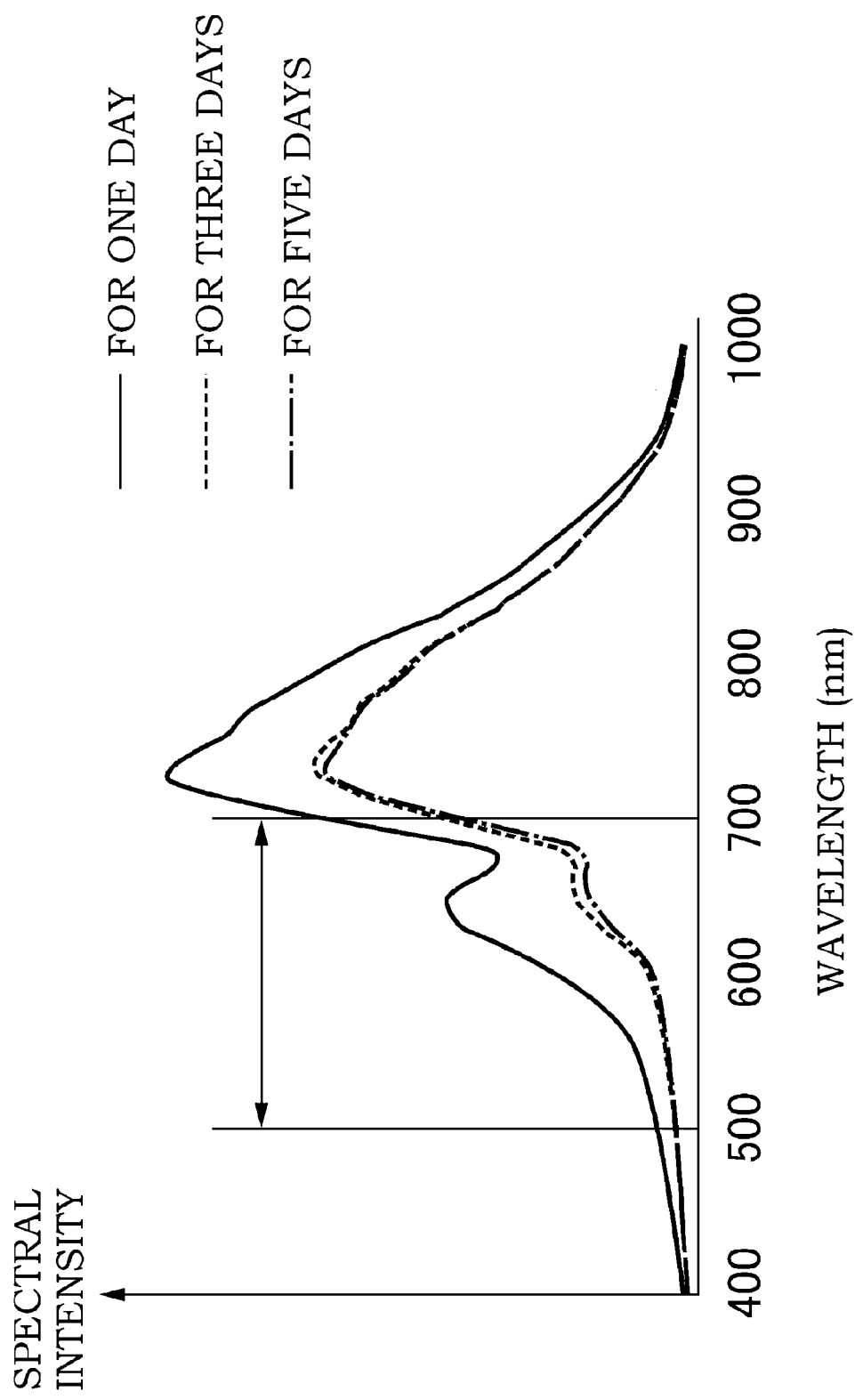
FIG. 7 is a diagram for describing an example for determining freshness of fruit using spectral data.

Here, the "detection algorithm information" refers to an algorithm for detecting spectral data necessary for determining a target event by actually photographing a subject using the spectral image capturing device 4 or the photographing apparatus 5. For example, as illustrated in FIG. 7, it is assumed that it is already known that a spectral intensity (reflectance) across a wavelength range of 500 nm to 700 nm is different depending on freshness of a certain fruit. That is, it is known that the spectral intensity (reflectance) abruptly changes at a wavelength range of 500 nm to 700 nm when any fruit is placed under the room temperature for a day, for three days, and for five days. In this case, it is possible to determine freshness of fruit by creating a spectral image at the wavelength range of 500 nm to 700 nm.

Any wavelength of the wavelength range in which the target event can be determined is specified as a characteristic wavelength. In the example of FIG. 7, any wavelength of the wavelength range of 500 nm to 700 nm is specified as a characteristic wavelength. One characteristic wavelength or a plurality of characteristic wavelengths may be specified. As a method of specifying the characteristic wavelength, for example, a center wavelength of 600 nm within the wavelength range (500 nm to 700 nm) may be selected, or a wavelength at which a difference of the spectral intensity between spectra is largest may be selected. In addition, while it is recognized that a peak is formed on each spectral data at a wavelength of approximately 650 nm in FIG. 7, such a characteristic point may also be specified as the characteristic wavelength. This characteristic wavelength may also be different depending on each target event of the subject.

In addition, a characteristic wavelength range is set by centering this characteristic wavelength. The characteristic wavelength range is set to a predetermined wavelength range such as ±10 nm. For this reason, if the characteristic wavelength is set to 500 nm, and the characteristic wavelength range is set to ±10 nm, a range for actually detecting the spectral data becomes 495 to 505 nm. This characteristic wavelength range may be different depending on each target event of the subject.

In addition, the detection algorithm information may include various computation methods. In this case, the characteristic wavelength or the characteristic wavelength range is set as an explanatory variable $x1, x2, \ldots,$ and $xk$, and determination is performed using a response variable $y$ obtained by applying the explanatory variable to a computation formula. That is, a response variable "y" obtained from "$y=f(x1, x2, \ldots, xk)$" becomes the detection algorithm information. Similar to the characteristic wavelength or the characteristic wavelength range, individual explanatory variables $x1, x2, \ldots,$ and $xk$ included therein also are the detection algorithm information.

The algorithm database 3 stores the characteristic wavelength, the characteristic wavelength range, and a computation method or a computation formula itself as necessary for each reference target event of the subject in association with each other.

Figure 8:
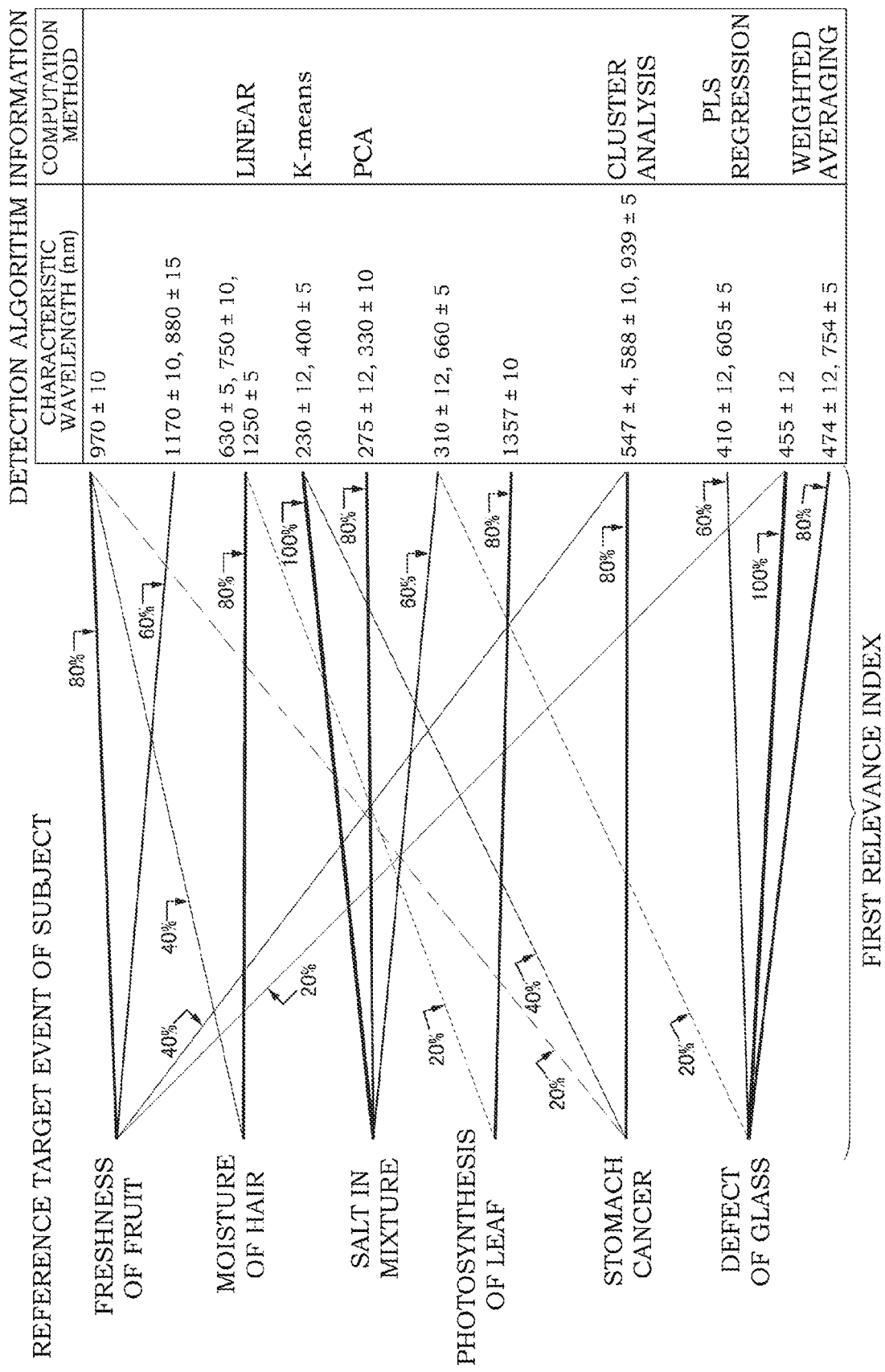
FIG. 8 is a diagram illustrating a network in which a reference target event of a subject and detection algorithm information are associated with each other using a first relevance index.

In this case, the algorithm database 3 may be defined on the basis of a first relevance index having three or more levels between the reference target event of the subject and the detection algorithm information. FIG. 8 illustrate a network in which the reference target event of the subject and the detection algorithm information are associated with each other using the first relevance index having three or more levels. For example, the freshness of fruit has a first relevance index of 80% for a case where the characteristic wavelength and the characteristic wavelength range as the detection algorithm information are set to "970±10 nm", has a first relevance index of 60% for the case of two wavelengths including "1170±10 nm" and "880±15 nm", has a first relevance index of 40% for a case where three wavelengths including "547±4 nm", "588±10 nm", "939±5 nm" are set as the detection algorithm information, and the computation method is set as a cluster analysis, and has a first relevance index of 20% for the case of "455±12 nm". The moisture of hair has a first relevance index of 80% for a case where the characteristic wavelength and the characteristic wavelength range as the detection algorithm information are set to three wavelengths including "630±5 nm", "750±10 nm", "1250±5 nm", and the computation method is set as "linear", and has a first relevance index of 20% for the case of "970±10 nm". The stomach cancer has a first relevance index of 20% for a case where the characteristic wavelength and the characteristic wavelength range as the detection algorithm information are set to "970±10 nm", has a first relevance index of 40% for a case where the detection algorithm information are set to two wavelengths including "230±12 nm" and "400±5 nm", and the computation method is set to "K−means", and has a first relevance index of 80% for a case where the detection algorithm information are set to three wavelengths including "547±4 nm", "588±10 nm", and "939±5 nm", and the computation method is set to "cluster analysis". A so-called neural network may also be employed to set the first relevance index.

The first relevance index represents congeniality of the detection algorithm information selected to determine the target event of the subject using the spectral image capturing device 4 or the photographing apparatus 5, in other words, accuracy of the detection algorithm information selected to determine the target event of the subject. In the aforementioned example, the congeniality is best when the detection algorithm for detecting freshness of fruit is set to "970±10 nm". This means that the determination can be performed with the highest effectiveness and precision. In detection of freshness of fruit, the congeniality level is sequentially set in order of the case of two wavelengths including "1170±10 nm" and "880±15 nm", the case where the detection algorithm information is set to three wavelengths including "547±4 nm", "588±10 nm" and "939±5 nm", and the computation method is set to "cluster analysis", and the case of "455±12 nm".

Figure 9:
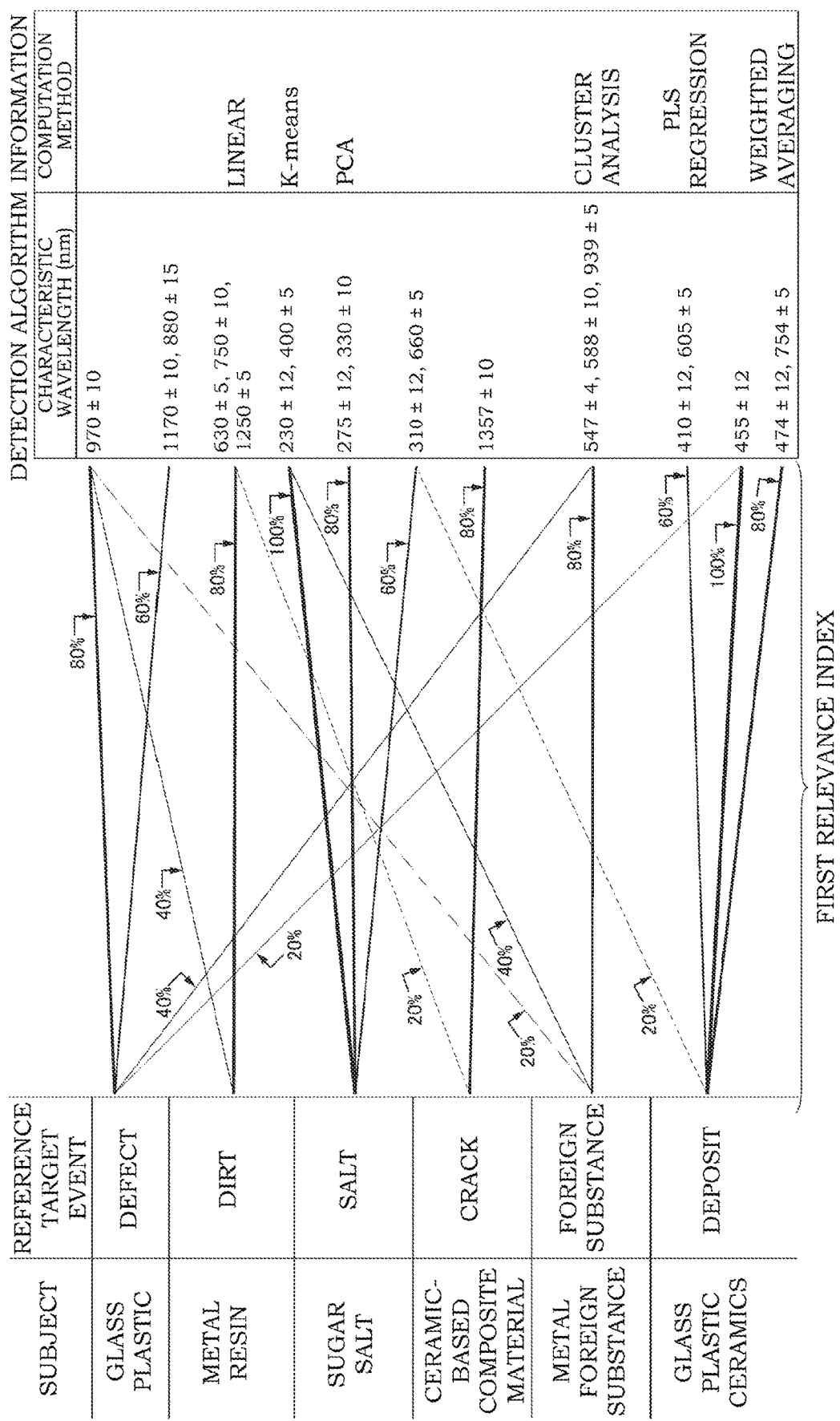
FIG. 9 is a diagram illustrating an example in which various parameters of an illumination system and an imaging system are associated in addition to the target event of the subject using the first relevance index.

A notation method of the target event of the subject is not limited to the aforementioned one. For example, as illustrated in FIG. 9, association using the first relevance index is performed even when the subject is a composite material formed of two or more materials. In the example of FIG. 9, a composite material formed by inserting a plastic material between glass plates is set as the subject, and a defect in the plastic material is set as the reference target event. This composite material may include a laminated body formed by laminating, for example, a plurality of metal layers and resin layers or a mixture formed by mixing different materials such as sugar and salt. Alternatively, the composite material may include an integrated body such as a ceramic-based composite material obtained by using ceramics as a base material and adding whiskers as a second layer.

Alternatively, a foreign substance contained in a composite material consisting of metal and the foreign substance may be set as the reference target event. In this example, one of elements of the composite material is set as the reference target event. Alternatively, the subject may include a composite material consisting of three or more materials such as glass, a plastic material, and ceramics. The reference target event is defined for each of these composite materials.

Even when the subject is formed of a composite material in this manner, the detection algorithm information is associated using the relevance index having three or more levels. If the subject is formed of a composite material containing metal and a foreign substance, the characteristic wavelength of the foreign substance in addition to the characteristic wavelength of the metal is also considered as the characteristic wavelength of the detection algorithm information, and this characteristic wavelength is associated using the relevance index by researching a condition suitable for extracting the reference target event from the subject in advance.

In the example in which the subject is formed of a composite material, for example, metal having a mixed crystal state around martensitic transformation may be set as the subject, and individual phase may be set as the reference target event. In addition, in a case where the subject itself is formed of a single-phase material instead of the composite material, but the single-phase material changes in a time-series manner, the changed phase may be set as the reference target event.

After step S13, the information search program selects the detection algorithm information one or more times from the character strings included in the target event of the subject extracted in step S12.

When the detection algorithm information is selected from the character string included in the target event of the subject extracted in step S12, the first relevance index between the reference target event of the subject and the detection algorithm information obtained in advance of FIG. 8 is referenced. For example, in a case where the target event of the subject extracted in step S12 is "leaf photosynthesis", and the first relevance index described above is referenced, "1357±10 nm" having a high first relevance index with the "leaf photosynthesis" is selected as the detection algorithm information. The case of "630±5 nm, 750±10 nm, and 1250±5 nm" and "linear" as the computation method where the first relevance index is low, but the relevance itself is recognized may also be selected as the detection algorithm information. Alternatively, other pieces of detection algorithm information to which no arrow is linked may also be selected.

In a case where the target event of the subject extracted in step S12 is "moisture of leaf", such an item does not exist as the reference target event of the subject. In this case, optimum detection algorithm information may be estimated from any one of the case of "1357±10 nm" having the high first relevance index with the "leaf photosynthesis" as the reference target event of the subject, the case of "630±5 nm, 750±10 nm, 1250±5 nm" and "linear" as the computation method, the case of "630±5 nm, 750±10 nm, 1250±5 nm" having the high first relevance index with the "moisture of hair" and "linear" as the computation method, and the case of "970±10 nm". In this case, for example, the common first relevance index "630±5 nm" may be estimated as the detection algorithm information of the "moisture of leaf", or all the characteristic wavelengths having the first relevance index of 40% or higher out of those associated with "leaf photosynthesis" and "moisture of hair" may be estimated as the detection algorithm information. In addition, a wavelength obtained by weighted averaging all the detection algorithms having the first relevance index of 0% or higher with the "leaf photosynthesis" and "moisture of hair" using the respective first relevance indexes may be estimated as the detection algorithm information.

When the target event of the subject extracted in step S12 is "cancer of tongue", such an item does not exist in the reference target event of the subject. Although the "stomach cancer" exists as a past target event of the subject regarding the "cancer", there is no reference target event of the subject regarding the "tongue". In this case, estimation may be performed on the basis of the past detection algorithm information of the "stomach cancer". If there is past detection algorithm information regarding "lip" or the like which is close to the "tongue", estimation may be performed on the basis of the past detection algorithm information.

In a case where the subject extracted in step S12 is a mixture of sugar and salt, and the extracted target event is "salt", the case of "230±12 nm, 400±5 nm" as the wavelength and "K-means" as the computation method is preferentially selected as the detection algorithm information by referencing the first relevance indexes of FIG. 9.

In a case where the subject extracted in step S12 is, for example, "paper", and the extracted target event is "foreign substance", there is no subject matching this case even by referencing the first relevance indexes of FIGS. 8 and 9. However, the "foreign substance" as the reference target event exists in the case of a mixture of "metal" and "foreign substance" as the subject. In this case, the detection algorithm information having the low first relevance index for the case where a mixture "metal" and "foreign substance" is set as the subject, and the "foreign substance" is set as the reference target event may also be selected.

That is, selection of the detection algorithm information is not limited to a descending order case in which the higher first relevance index is selected with a higher priority. Instead, an ascending order in which the lower first relevance index is selected with a higher priority may also be possible. Alternatively, any other selection method based on a priority may also be employed.

The method of selecting the detection algorithm information for the target event of the subject extracted in step S12 is not limited to the aforementioned method. Instead, any other method may be employed as long as it references the first relevance index. In addition, the search operation of step S13 may be performed using artificial intelligence. In this case, the first relevance index may be regarded as a neural network.

Then, the process advances to step S14, and the selected detection algorithm information is displayed using the display unit 23. As a result, a user can immediately identify the detection algorithm information depending on a target event of the subject to be determined therefrom by visually recognizing the display unit 23.

A user sets the detection algorithm of the image processing unit 484 in the spectral image capturing device 4 or the detection algorithm of the photographing apparatus 5 on the basis of the output detection algorithm information. In this setting of the detection algorithm, a color operation process (hereinafter, referred to as "characteristic wavelength computation") based on the characteristic wavelength is performed in addition to the characteristic wavelength and the characteristic wavelength range. For example, in a case where the target event of the subject is "leaf photosynthesis", and "1357±10 nm" is selected as the detection algorithm, the spectral image capturing device 4 or the photographing apparatus 5 is set such that characteristic wavelength computation for displaying red is performed for pixels included in this wavelength range, and the characteristic wavelength computation for displaying white is performed for a pixel not included in this wavelength.

As a result, by photographing "leaf" as a subject using the spectral image capturing device 4 or the photographing apparatus 5, it is possible to detect spectral data necessary for determining "photosynthesis" as the target event and display it using a color analysis image.

In particular, according to the present invention, it is possible to easily acquire optimum detection algorithm information of spectral data depending on a target event of the subject to be determined therefrom by the spectral image capturing device 4 or the photographing apparatus 5. It is possible to reduce a burden of labor for researching an optimum detection algorithm and thus shorten time whenever a new target event of the subject is sequentially generated.

The information search system 1 according to the present invention is characterized in that optimum detection algorithm information is searched using the first relevance index set in three or more levels. The first relevance index may be described, for example, using a numerical value of 0 to 100%. However, the invention is not limited thereto. The first relevance index may be described in any number of levels as long as it can be described using a numeral value having three or more levels.

Since the search operation is performed on the basis of the first relevance index expressed as a numerical value having three or more levels in this manner, the detection algorithm information may be searched and displayed in a descending order of the first relevance index when a plurality of pieces of detection algorithm information are selected. If the detection algorithm information is displayed for a user in a descending order of the first relevance index, a user may be urged to select detection algorithm information having a higher possibility with a higher priority. Meanwhile, even detection algorithm information having a lower first relevance index may be displayed as a second opinion. This is useful when the analysis is not easy using the first opinion.

In addition, according to the present invention, it is possible to determine the detection algorithm information having a significantly low first relevance index such as 1% without missing. Therefore, it is possible to allow a user to pay attention to a fact that even detection algorithm information having a significantly low first relevance index is linked to an insignificant indication and may be useful as the detection algorithm information once in several tens or hundreds of times.

According to the present invention, since the search operation is performed on the basis of the first relevance index having three or more levels in this manner, it is possible to select the search strategy by setting a threshold value advantageously. If the threshold value is set to be lower, it is possible to catch the detection algorithm information without missing even when the first relevance index described above is 1%. However, the detection algorithm information having a low possibility of suitably detecting the target event of the subject may be selected frequently in some cases. In comparison, if the threshold value is set to be higher, it is possible to narrow only the detection algorithm information having a high possibility of suitably detecting the target event of the subject. However, a photographing condition that may be suitable once in several tens or hundreds of times may be overlooked in some cases. Which one is emphasized may be decided from the viewpoint of a user side or a system side. However, it is possible to improve a degree of freedom for selecting such an emphasis point.

According to the present invention, the first relevance index described above may be updated. That is, the reference target event of the subject and the detection algorithm information illustrated in FIG. 8 are updated as necessary. This updating may be performed to reflect information provided via a public communication network such as the Internet. When new knowledge about a relationship between the reference target event of the subject and the detection algorithm information is found through site information or writings obtainable from the public communication network, the first relevance index increases or decreases depending on the knowledge. For example, when a fact that a detection algorithm having a certain level of the first relevance index for a certain reference target event of the subject can detect the target event with high precision is cited many times via the sites of the public communication network, the first relevance index set therebetween further increases. In addition, when a fact that a detection algorithm having a certain level of the first relevance index for a certain reference target event of the subject does not detect the target event well with high precision is cited many times via the sites of the public communication network, the first relevance index set therebetween decreases. In addition, when a fact that a certain reference target event of the subject can be detected with high accuracy using a detection algorithm that has not existed so far is cited via the sites of the public communication network, the updating may be performed by setting a new first relevance index therebetween.

The first relevance index may be updated on the basis of information obtainable from the public communication network. In addition, the updating may be performed artificially or automatically by the system side or the user side on the basis of the contents of research data, papers, conference presentations, newspaper articles, books, or the like by experts. Artificial intelligence may also be utilized in this updating processing.

Note that the first embodiment is not limited to the aforementioned examples. The detection algorithm information may be searched by inputting the target event of the subject, information on the illumination light described above, various parameters of the imaging system, and parameters of hardware as the information to be input in step S11.

The search apparatus 2 may search the photographing condition to be provided to the photographing apparatus 5. The information search program searches a photographing condition having a high relevance index with the acquired target event. Before this search, the algorithm database 3 acquires the first relevance index between the reference target event and the photographing condition in advance as illustrated in FIG. 10.

Here, the "photographing condition" includes information on the illumination light such as a wavelength, an irradiation angle, and a luminance of illumination light used in photographing of the spectral image capturing device 4 or the photographing apparatus 5, and a condition of a polarization filter provided in the illumination light, and various parameters of the imaging system or hardware such as an F-number of the spectral image capturing device 4 or the photographing apparatus 5, a numerical aperture (NA) and a focal length of the lens, a model of use, a wavelength resolution, a spatial resolution, sensitivity to each spectral wavelength, exposure time, auto focus time, a shutter speed, a shutter type, a white balance, a black balance, a gain, and the like. Each parameter described above may be added to the detection algorithm information in addition to the characteristic wavelength, the characteristic wavelength range, and the computation method described above. Furthermore, each parameter described above may be defined as a condition for obtaining the characteristic wavelength or the characteristic wavelength range described above.

When such various photographing conditions are associated using the first relevance indexes, the wavelength resolution may be ranked into some groups such as "96 to 120 dpi", "120 to 144 dpi", and "144 to 192 dpi", and the first relevance index may be associated with each rank.

Figure 10:
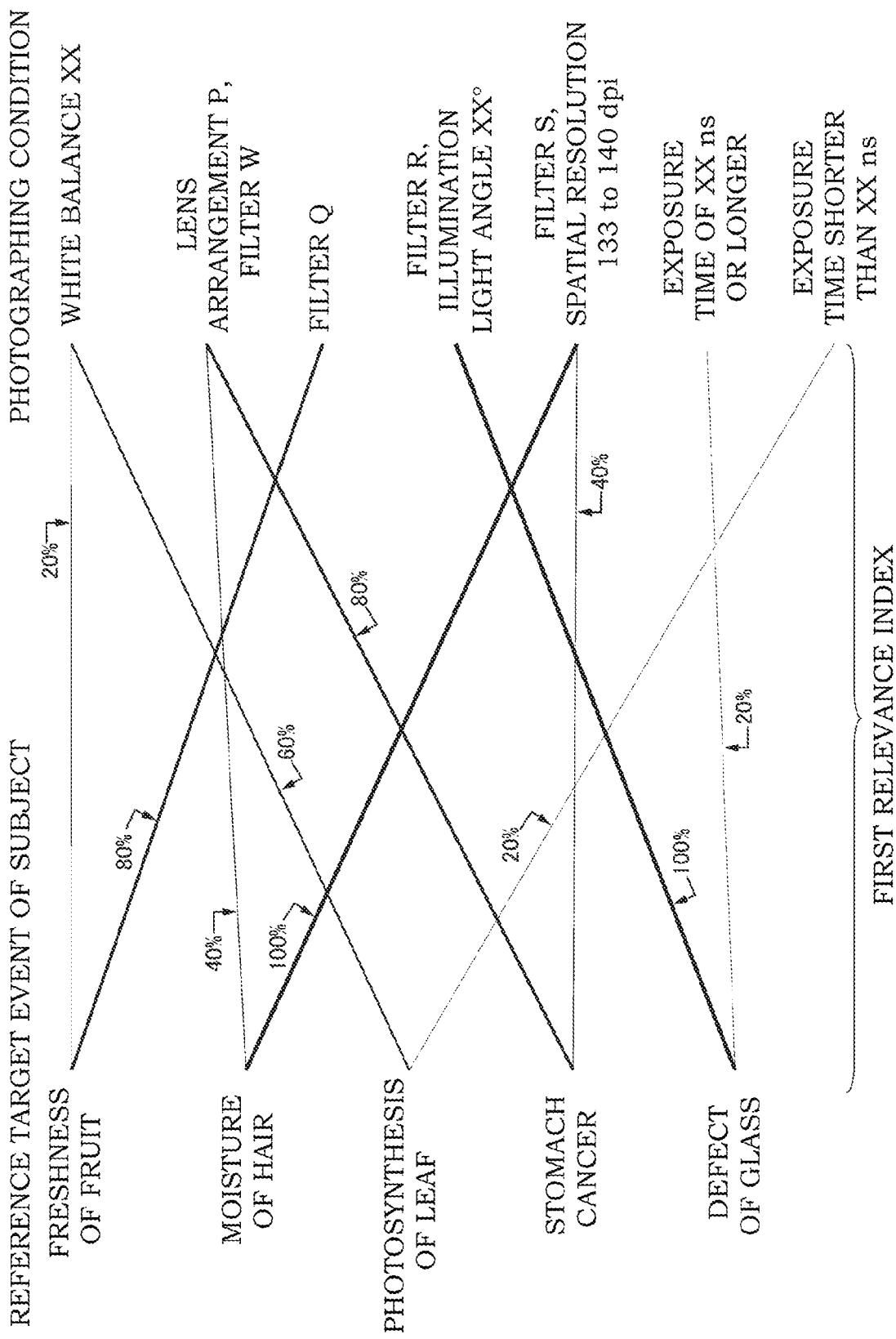
FIG. 10 is a diagram for describing another example of the first relevance index.

For example, such a photographing condition is set as "white balance XX", a combination of "lens arrangement P" and "filter W", "filter Q", a combination of "filter R" and "illumination light angle XX°", a combination of "filter S" and "spatial resolution 133-140 dpi", "exposure time of XX ns or longer", "exposure time shorter than XX ns", or the like as illustrated in FIG. 10.

The photographing condition may include a plurality of factors in combination or may include a single factor. The photographing condition such as "exposure time" may be classified into "exposure time of XX ns or longer" and "exposure time shorter than XX ns", and then, a second relevance index may be associated with each of the factors. Furthermore, a specific condition may be allocated to each factor. For example, "filter Q" may have a filter transmission wavelength of 600 to 650 nm or the like. For example, "filter R" may have a filter transmission wavelength of 340 to 400 nm or the like. For example, "filter S" may have a filter transmission wavelength of 1000 to 1100 nm or the like.

The reference target event of the subject and the photographing condition are associated with each other using the first relevance index. For example, "freshness of fruit" is associated with "filter Q" at a first relevance index of 80%, and is associated with "white balance XX" at a first relevance index of 20%. The "moisture of hair" is associated with a combination of "filter S" and "spatial resolution of 133 to 140 dpi" at a first relevance index of 100%, and is association with a combination of "lens arrangement P" and "filter W" at a first relevance index of 40%. The "leaf photosynthesis" is associated with "white balance XX" at a first relevance index of 60%, and is associated with "exposure time shorter than XX ns" at a first relevance index of 20%. The "stomach cancer" is associated with a combination of "lens arrangement P" and "filter W" at a first relevance index of 80%, and is associated with "filter S" and "spatial resolution of 133 to 140 dpi" at a first relevance index of 40%. The "defect of glass" is associated with "filter R, illumination light angle of XX°" at a first relevance index of 100%, and is associated with "exposure time of XX ns or longer" at a first relevance index of 20%.

The first relevance index refers to congeniality of the photographing condition of the photographing apparatus 5 in determination based on each reference target event. In other words, the first relevance index indicates accuracy of the design or the photographing method of the photographing apparatus 5 for the reference target event and further the target event of the subject determined using it. In the aforementioned example, a combination of "lens arrangement P" and "filter W" has best congeniality as a photographing condition for the "stomach cancer" and further indicates that it is possible to perform determination with highest effectiveness and precision. It is recognized that the photographing condition for "stomach cancer" is linked to "filter S" and "spatial resolution of 133 to 140 dpi".

The algorithm database 3 stores each photographing condition described above in association with the reference target event described above using the first relevance index.

The information search program may reference the first relevance index of FIG. 10 in order to search a photographing condition having higher congeniality with a newly input target event. For example, in a case where the newly input target event is "moisture of hair", and the first relevance indexes described above are referenced, "filter S" and "spatial resolution of 133 to 140 dpi" having a high first relevance index with the reference detection algorithm information corresponding thereto are selected as the photographing condition. A combination of "lens arrangement P" and "filter W", where the first relevance index is low, but the relevance itself is recognized, may also be selected as the photographing condition. Similarly, when the newly input target event is the "stomach cancer", a combination of "lens arrangement P" and "filter W" is selected.

Similarly, in the embodiment of FIG. 10, selection of the photographing condition is not limited to a descending order case in which the higher first relevance index is selected with a higher priority. The photographing condition may be selected in an ascending order starting from the lower first relevance index case by case, or any other selection method based on a priority may also be employed.

Figure 11:
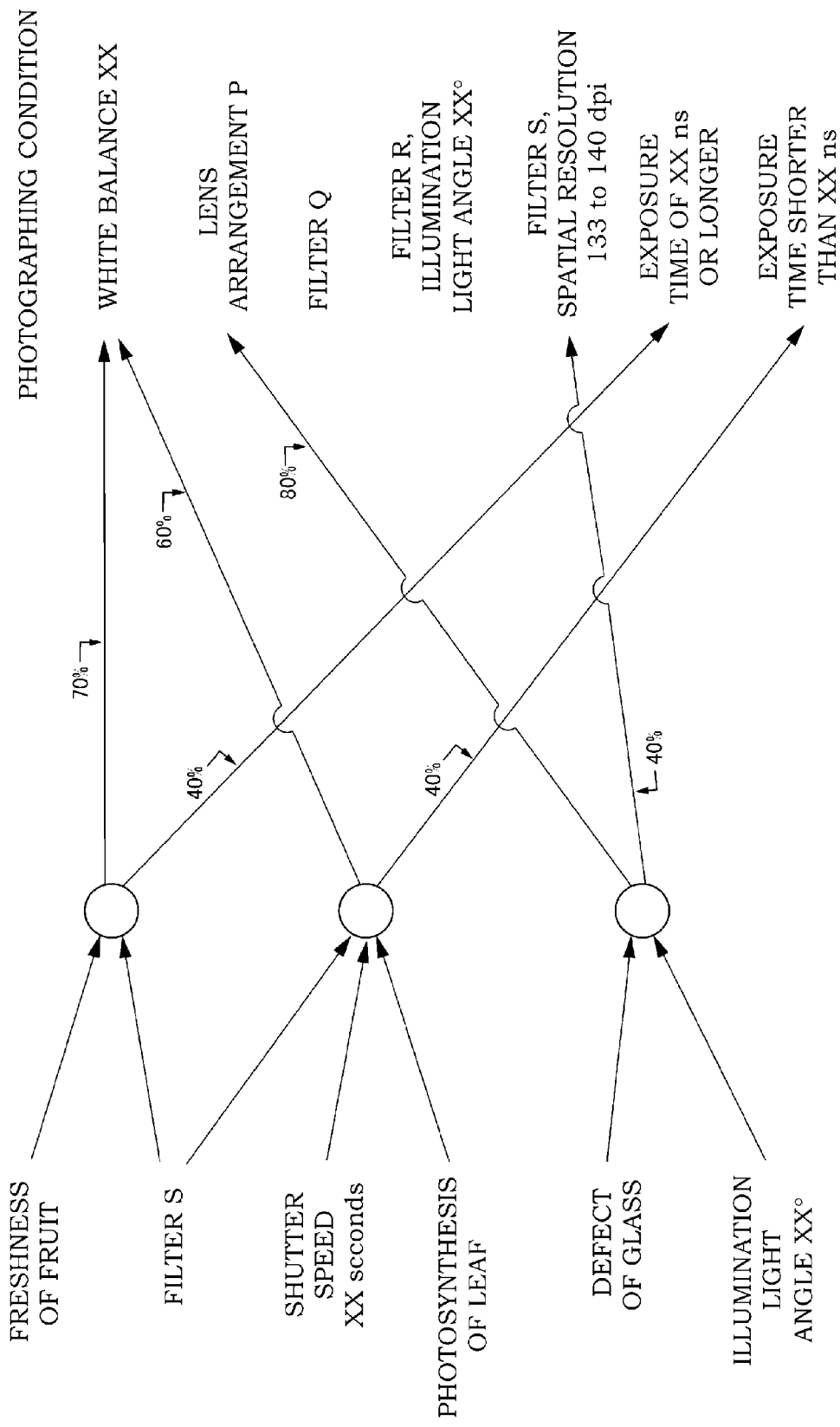
FIG. 11 is a diagram illustrating a network in which a reference target events of the subject and photographing conditions are associated with one another using the first relevance index.

FIG. 11 illustrates an example in which the photographing condition is associated with a combination of the reference target event and the reference photographing condition using the first relevance index having three or more levels. The reference photographing condition includes the same items as those of the aforementioned photographing condition. In the first relevance index of FIG. 11, a part of the photographing conditions in addition to the target event are input as known information using the manipulation unit 25. That is, while a part of the target events and the photographing conditions are already decided, it is difficult to decide the remaining photographing conditions. Therefore, the search operation is performed using the first relevance index.

Referring to FIG. 11, the reference target events or the reference photographing conditions are arranged in the left side using the first relevance index, and the photographing conditions to be actually searched are arranged in the right side using the first relevance index.

In a case where the reference target event is set to "freshness of fruit", and the reference photographing condition is set to "filter S", a node corresponding to a combination of them has a first relevance index of 70% with "white balance XX" and has a first relevance index of 40% with "exposure time of XX ns or longer". In addition, in a case where the reference photographing condition is set to "filter S" and "shutter speed of XX seconds", and the reference target event is "leaf photosynthesis", a node corresponding to a combination of them has a first relevance index of 60% with "white balance XX", and has a first relevance index of 40% with "exposure time shorter than XX ns".

If such first relevance indexes are stored in advance, it is possible to search a photographing condition by referencing the first relevance index when the known target event and the photographing condition are input through the manipulation unit 25. For example, in a case where "defect of glass" is input as the target event through the manipulation unit 25, and "illumination light angle of XX°" is input as the photographing condition, "lens arrangement", "filter S, spatial resolution of 133 to 140 dpi", or the like having a relevance index defined for a node corresponding to a combination of them is suitably selected.

After selecting them, the information search program displays the selected photographing condition on the display unit 23 of the search apparatus 2. As a result, a user can immediately recognize the photographing condition depending on the detection algorithm information by watching the display unit 23. Similarly, artificial intelligence may also be employed in such a search operation of the photographing condition. That is, the first relevance index may be configured using a neural network.

A user designs each of the imaging optical system 51, the filter 52, the image capturing element 53, the signal processing unit 54, and the like of the photographing apparatus 5 on the basis of the output photographing condition, sets the condition of the illumination light, or decides various conditions regarding the photographing. In addition, a user designs each configuration of the spectral image capturing device 4 or decides each condition on the basis of the output photographing condition.

In the course of inputting the known photographing condition, for example, the known photographing condition may be automatically extracted instead of being input using the manipulation unit 25. Means for extracting the photographing condition may be, for example, a device capable of reading electronic data or information disclosed on the Internet regarding manuals of the employed photographing apparatuses 4 and 5 using a text mining technology and analyzing it, or may include a PC or the like. Information regarding the photographing condition may be extracted from the analyzed information and may be input as the known photographing condition described above. In addition, in a case where the exposure time is extracted as the known photographing condition, a device for measuring actual exposure times of the photographing apparatuses 4 and 5 may be used, or the photographing apparatuses 4 and 5 may be directly connected to the PC to read the set exposure time.

Figure 12:
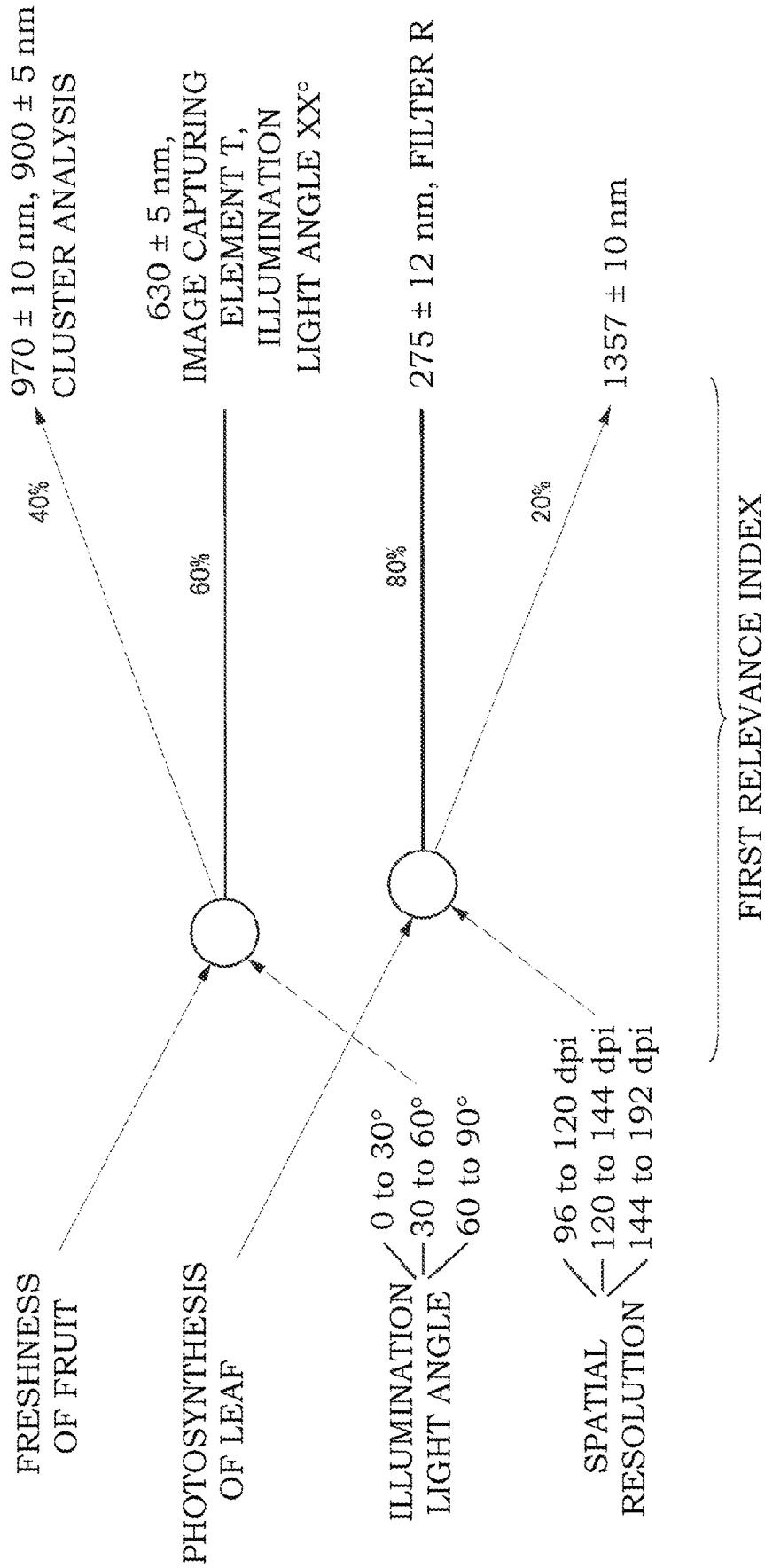
FIG. 12 is a diagram illustrating a network in which reference target events of subjects, reference photographing conditions, and photographing conditions are associated with one another using the first relevance index.

FIG. 12 illustrates an example in which detection algorithm information or a combination of the detection algorithm information and the photographing condition is associated with a combination of the reference target event and the reference photographing condition using the first relevance index having three or more levels. The first relevance indexes of FIG. 12 are examples for a case where a part of the photographing conditions is input as the known information in addition to the target event using the manipulation unit 25. That is, since a part of the target events and the photographing conditions are decided already, but the remaining photographing conditions and the detection algorithm information are not decided, they are searched using the first relevance index.

Referring to FIG. 12, the reference target events or the reference photographing conditions are arranged in the left side using the first relevance indexes, and the detection algorithm information to be actually searched or combinations of the photographing condition and the algorithm information are arranged in the right side using the first relevance indexes.

In a case where the reference target event is set to "freshness of fruit", and the reference photographing condition is set to "illumination light angle of 30 to 60°", a node corresponding to a combination of them has a first relevance index of 60% with "630±5 nm, image capturing element T, illumination light angle XX°" and has a first relevance index of 40% with "970±10 nm, 900±5 nm, cluster analysis". In a case where the reference target event is set to "leaf photosynthesis", and the reference photographing condition is set to "spatial resolution of 120, illumination light angle of 30 to 60°", a node corresponding to a combination of them has a first relevance index of 80% with "275±12 nm, filter R" and has a first relevance index of 20% with "1357±10 nm".

In a case where such first relevance indexes are stored in advance, it is possible to search the photographing condition by referencing the first relevance index when the known target event and the photographing condition are input through the manipulation unit 25. For example, in a case where the target event input through the manipulation unit 25 is "freshness of fruit", and the input photographing condition is "illumination light angle of 30 to 60°", information having relevance indexes with a node corresponding to a combination of them, such as "630±5 nm, image capturing element T, illumination light angle XX°" and "970±10 nm, 900±5 nm, cluster analysis", are suitably selected.

Figure 13:
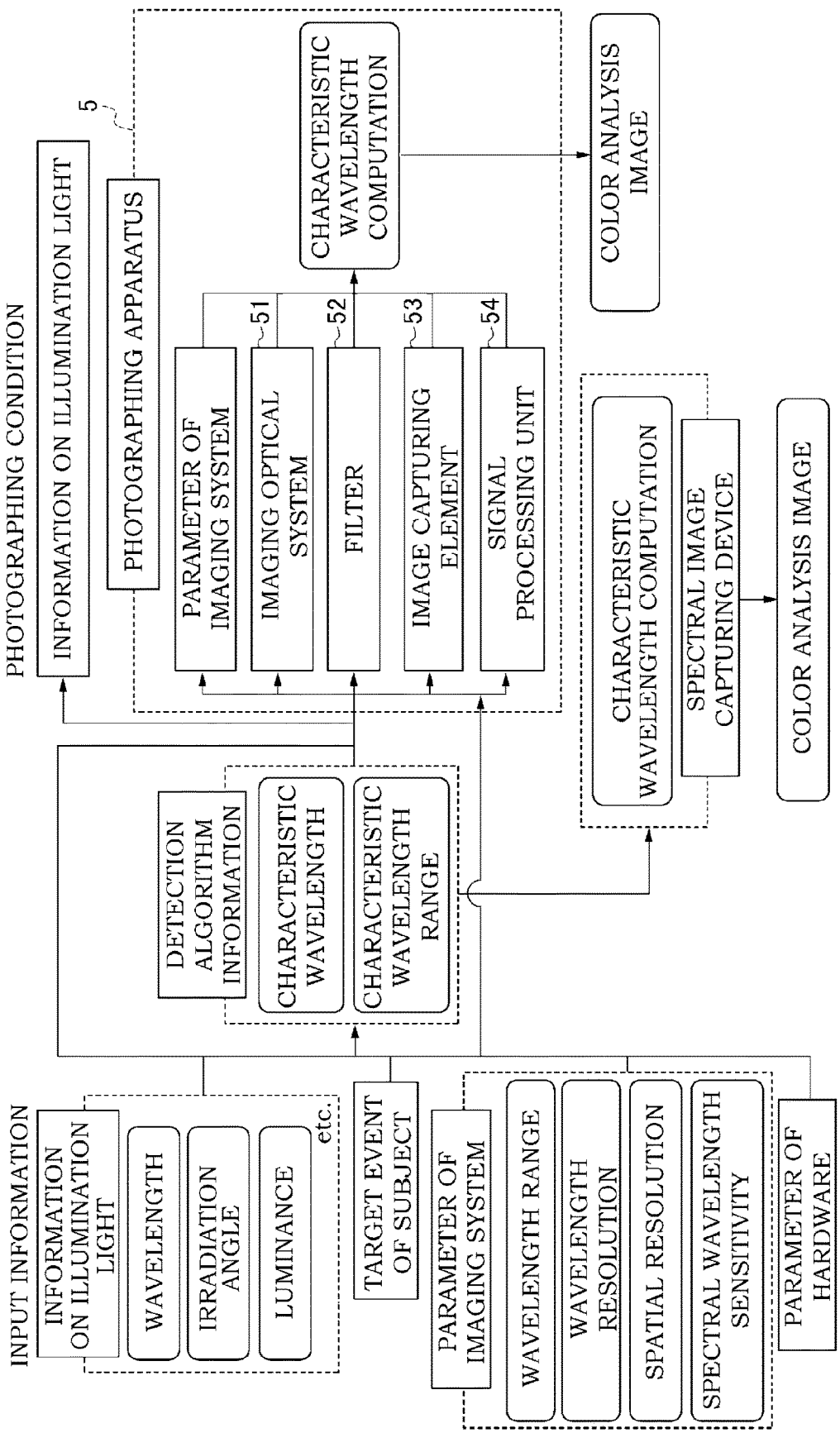
FIG. 13 is a data flow diagram until a photographing condition of the photographing apparatus is acquired starting from an input of the target event of the subject.

FIG. 13 illustrates a data flow until a photographing condition of the photographing apparatus 5 is acquired starting from the input of the target event of the subject.

The input information includes, in addition to the target event of the subject, parameters of the illumination system such as a wavelength of the illumination light, an irradiation angle of the illumination light irradiated onto the subject, and a luminance of the illumination light, parameters of the imaging system such as a wavelength range of the spectral image capturing device 4 or the photographing apparatus 5, a wavelength resolution, a spatial resolution, a spectral wavelength sensitivity, and a polarization filter, or the like. In addition, parameters of hardware may also be input. The detection algorithm information or the photographing condition such as the characteristic wavelength or the characteristic wavelength range is searched by referencing the first relevance index described above on the basis of the input information. The detection algorithm information obtained in this manner is used to select algorithm information or a photographing condition most suitable for photographing the subject using the spectral image capturing device 4 or the photographing apparatus 5 by referencing the past data stored in the algorithm database 3 on the basis of the parameters of the illumination system and the parameters of the imaging system in addition to the input target event of the subject.

The subject is photographed by the spectral image capturing device 4 or the photographing apparatus 5 where the detection algorithm information is set, so that the characteristic wavelength computation is performed. As a result, it is possible to obtain a color analysis image subjected to the computation.

Note that the first embodiment described above is not limited to the aforementioned example. Under the assumption that the first relevance index described above is acquired, an input of the detection algorithm information may be received instead of receiving an input of the target event of the subject in step S11. In addition, in step S13, the target event of the subject is searched in reverse by referencing the first relevance index described above on the basis of the received detection algorithm information. That is, the input/output relationship of FIGS. 8 and 9 is exchanged with the aforementioned example, so that the detection algorithm information is set as an input, and the target event of the subject is set as an output.

As an application example of this aspect, for example, in a case where an unknown subject is photographed by the spectral image capturing device 4 or the photographing apparatus 5, and as a result, the characteristic wavelengths are 310 nm and 660 nm, it is possible to determine that salt of a mixture is highly likely the target event of the subject.

Second Embodiment

Figure 14:
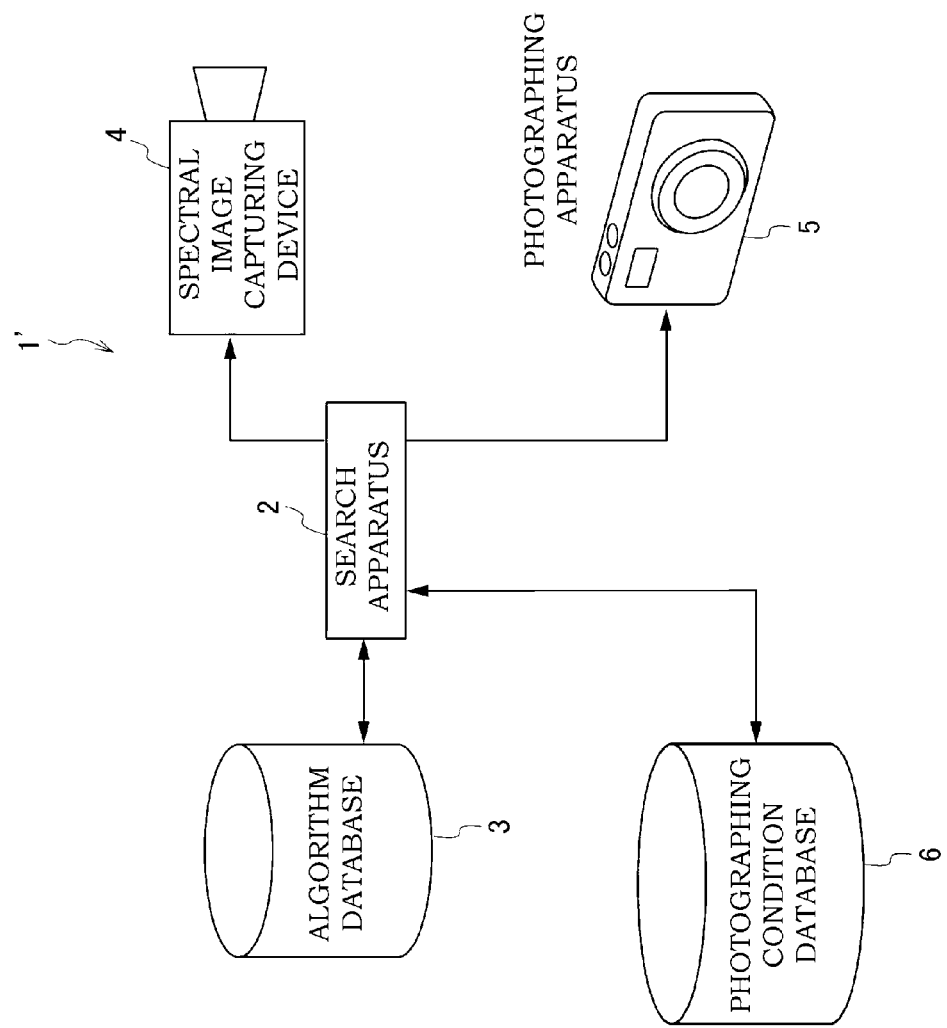
FIG. 14 is a block diagram illustrating a general configuration of an information search system according to a second embodiment of the invention.

FIG. 14 is a block diagram illustrating a general configuration of an information search system 1' according to a second embodiment of the invention. The information search system 1' is to search a photographing condition of a photographing apparatus 5 for determining a target event from a photographed subject 10. The information search system 1' includes an algorithm database 3, a photographing condition database 6, a search apparatus 2 connected to the algorithm database 3 and the photographing condition database 6, a spectral image capturing device 4 connected to the search apparatus 2, and a photographing apparatus 5.

In the second embodiment, like reference numerals denote like elements as in the first embodiment, and they will not be described repeatedly.

The photographing condition database 6 is a database regarding the photographing conditions of the photographing apparatus 5. The photographing condition database 6 stores information transmitted via a public communication network or information input by a user of this system. In addition, the photographing condition database 6 transmits the accumulated information to the search apparatus 2 in response to a request from the search apparatus 2.

Operations of the information search system 1' according to the second embodiment having the aforementioned configuration will be described.

First, the search apparatus 2 searches the photographing condition to be provided to the photographing apparatus 5. This search process starts as the photographing apparatus 5 acquires the detection algorithm information to be photographed. As the detection algorithm information, the detection algorithm information searched in the first embodiment may be directly applied, or a user may newly input the detection algorithm information. The detection algorithm information acquired in this manner is temporarily stored in the memory unit 28.

Figure 15:
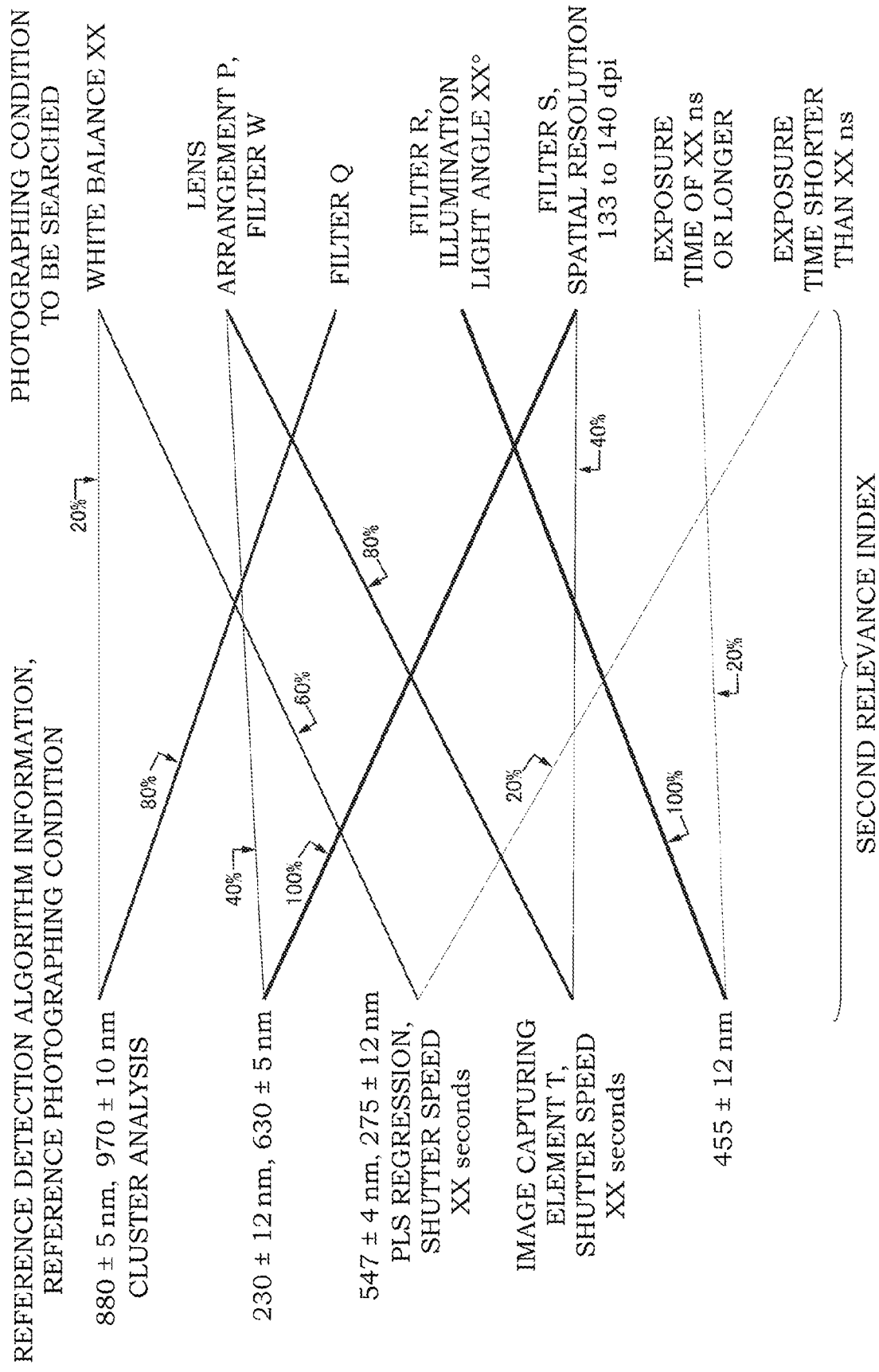
FIG. 15 is a diagram illustrating an example in which photographing conditions are associated with combinations of a plurality of pieces of detection algorithm information or the like using a second relevance index having three or more levels.

According to the second embodiment, the information search program searches a photographing condition having a high relevance index with the acquired detection algorithm information. Before this search operation, the photographing condition database 6 acquires the relevance index between the reference detection algorithm information and the photographing condition in advance as illustrated in FIG. 15.

Here, the "photographing condition" includes a specific configuration of the imaging optical system 51, a specific configuration of the filter 52, a specific configuration of the image capturing element 53, and a specific configuration of the signal processing unit 54 in the photographing apparatus 5. For example, the photographing condition includes "white balance XX", a combination of "lens arrangement P" and "filter W", "filter Q", a combination of "filter R" and "illumination light angle XX°", a combination of "filter S" and "spatial resolution 133-140 dpi", "exposure time of XX ns or longer", "exposure time shorter than XX ns", or the like as illustrated in FIG. 15.

The photographing condition may include a plurality of factors in combination or may include a single factor. The photographing condition such as "exposure time" may be classified into "exposure time of XX ns or longer" and "exposure time shorter than XX ns", and then, a second relevance index may be associated with each of the factors. Furthermore, a specific condition may be allocated to each factor. For example, "filter Q" may have a filter transmission wavelength of 600 to 650 nm or the like. For example, "filter R" may have a filter transmission wavelength of 340 to 400 nm or the like. For example, "filter S" may have a filter transmission wavelength of 1000 to 1100 nm or the like.

The detection algorithm information is similar to that of the first embodiment described above. That is, the detection algorithm information includes the characteristic wavelength, the characteristic wavelength range, the computation method, and the like. The second relevance index may be defined by combining the known photographing conditions such as information on the illumination light, various parameters of the imaging system, and parameters of hardware in addition to the detection algorithm information. Hereinafter, the detection algorithm information associated using the second relevance index will be referred to as "reference detection algorithm information", and the known photographing condition associated using the second relevance index will be referred to as a "reference photographing condition".

The reference detection algorithm information and the reference photographing condition are associated with the photographing condition to be searched using the second relevance index. For example, a combination of the computation method including a wavelength of 880±5 nm, a wavelength of 970±10 nm, and a cluster analysis is associated with "filter Q" at a second relevance index of 80%, and is associated with "white balance XX" at a second relevance index of 20%. A combination of wavelengths 230±12 nm and 630±5 nm is associated with a combination of "filter S" and "spatial resolution of 133 to 140 dpi" at a second relevance index of 100%, and is associated with a combination of "lens arrangement P" and "filter W" at a second relevance index of 40%. A combination of a wavelength of 547±4 nm, a wavelength of 275±12 nm, PLS regression, and a shutter speed of XX seconds is associated with "white balance XX" at a second relevance index of 60%, and is associated with "exposure time shorter than XX ns" at a second relevance index of 20%. A combination of the image capturing element T and the shutter speed of XX seconds is associated with a combination of "lens arrangement P" and "filter W" at a second relevance index of 80%, and is associated with "filter S" and "spatial resolution of 133 to 140 dpi" at a second relevance index of 40%. The characteristic wavelength of 455±12 nm is associated with "filter R" at a second relevance index of 100%, and is associated with "exposure time of XX ns or longer" at a second relevance index of 20%.

The second relevance index refers to congeniality of the photographing condition of the photographing apparatus 5 in determination based on each reference detection algorithm information or each reference photographing condition. In other words, the second relevance index indicates accuracy of the design or the photographing method of the photographing apparatus 5 for the reference detection algorithm information or the reference photographing condition, and further the target event of the subject determined using it. In the aforementioned example, a combination of "lens arrangement P" and "filter W" has best congeniality as a photographing condition to be searched for a combination of the image capturing element T and the shutter speed of XX seconds, and further indicates that it is possible to perform determination with highest effectiveness and precision. It is recognized that the photographing condition for the combination of the image capturing element T and the shutter speed of XX seconds is linked to "filter S" and "spatial resolution of 133 to 140 dpi".

The photographing condition database 6 stores each photographing condition in association with the reference detection algorithm information or the reference photographing condition described above using the second relevance index.

The information search program may reference the second relevance index of FIG. 15 in order to search a photographing condition having higher congeniality with the detection algorithm information searched in the first embodiment or the newly input detection algorithm information or reference photographing condition. For example, in a case where the newly input detection algorithm information is a combination of 230±12 nm and 630±5 nm, "filter S" and "spatial resolution of 133 to 140 dpi" having a high second relevance index with the reference detection algorithm information corresponding thereto are selected as the photographing condition in a case where the second relevance index or the reference photographing condition described above is referenced. A combination of "lens arrangement P" and "filter W", where the second relevance index is low, but the relevance itself is recognized, may also be selected as the photographing condition. Similarly, when the detection algorithm information searched in the first embodiment or the reference photographing condition is the image capturing element T and the shutter speed of XX seconds, a combination of "lens arrangement P" and "filter W" is selected.

Similarly, in the second embodiment, selection of the photographing condition is not limited to a descending order case in which the higher second relevance index is selected with a higher priority. The photographing condition may be selected in an ascending order starting from the lower second relevance index case by case, or any other selection method based on a priority may also be employed.

If the detection algorithm information searched in the first embodiment (the input detection algorithm information) does not match the reference detection algorithm information, a characteristic wavelength range of this reference detection algorithm information may be widened. For example, in a case where the acquired detection algorithm information is a wavelength of 660 nm, it is not included in any reference detection algorithm information stored in the photographing condition database 6. In this case, the characteristic wavelength range of the reference detection algorithm information may be widened to ±30 nm. Alternatively, a similar reference detection algorithm may be estimated and allocated.

FIG. 16 illustrates an example in which the photographing condition is associated with a combination of the reference detection algorithm and the reference photographing condition using the second relevance index having three or more levels. In a case where the reference detection algorithm or the reference photographing condition belongs to a combination group 1) and a combination group 2), a combination thereof is associated with "white balance XX" at a second relevance index of 80% and is associated with a combination of "filter R" and "illumination light angle of XX°" at a second relevance index of 20%. In a case where the reference detection algorithm has a logical product or logical sum of each combination group 3) to 5), a combination thereof is associated with a combination of "filter S" and "spatial resolution of 133 to 140 dpi" at a second relevance index of 60%, and is associated with "exposure time shorter than XX ns" at a second relevance index of 20%.

In a case where such second relevance indexes are stored in advance, and the detection algorithm information searched in the first embodiment or the known photographing condition (the input detection algorithm information or reference photographing condition) is a combination of the combination groups 1) and 2), it is possible to search "white balance XX" having a second relevance index of 80%, and "filter R" and "illumination light angle XX°" having a second relevance index of 20% by referencing the second relevance indexes.

After selecting them, the information search program displays the selected photographing condition on the display unit 23 of the search apparatus 2. As a result, a user can immediately recognize the photographing condition to be searched depending on the detection algorithm information or the known photographing condition by watching the display unit 23. Similarly, artificial intelligence may be employed in such a search operation according to the second embodiment. That is, the second relevance index may be configured using a neural network.

Figure 17:
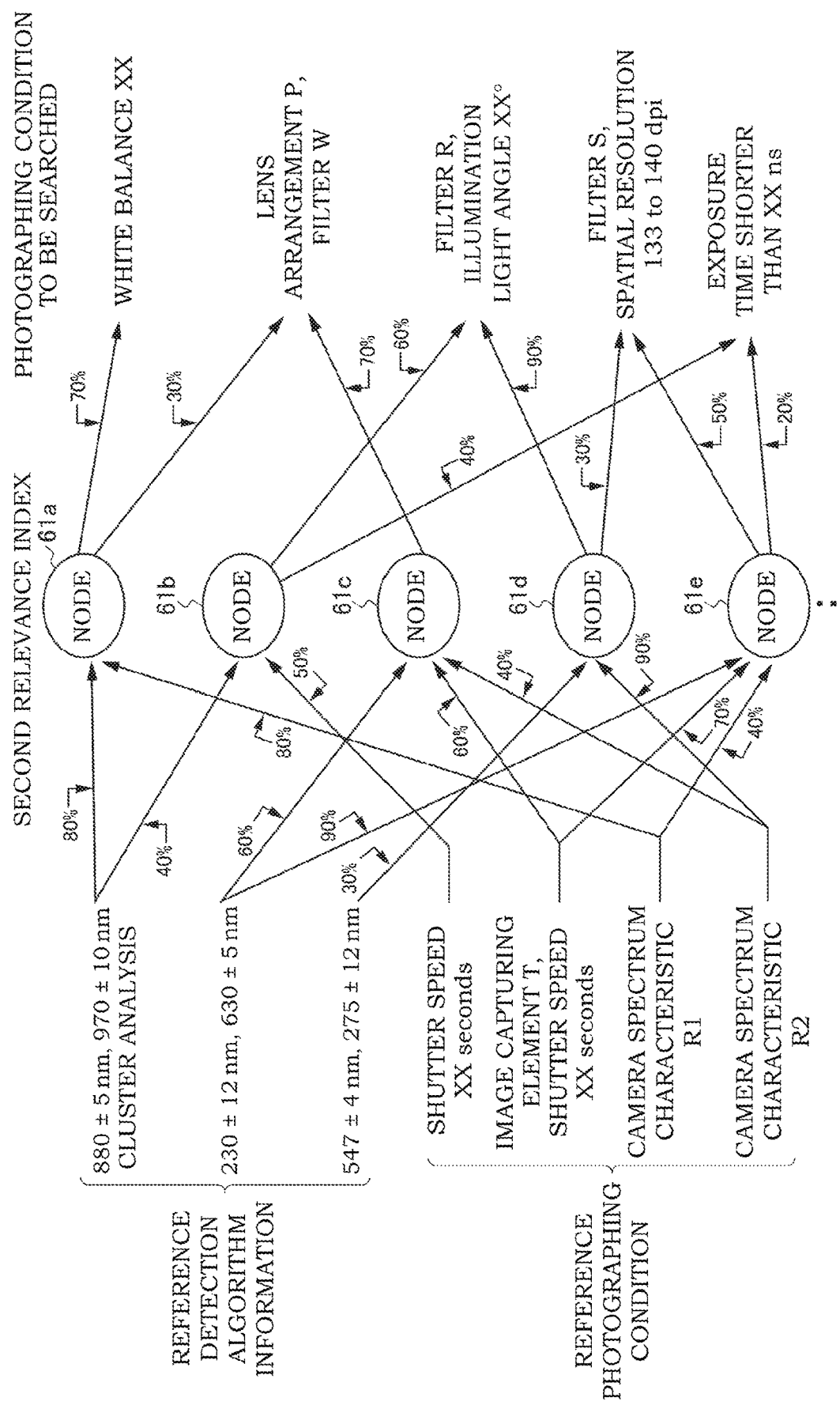
FIG. 17 is a diagram for describing an exemplary combination of the second relevance indexes.

Such a combined second relevance index may be set as illustrated in FIG. 17. In the example of FIG. 17, combinations of one or more pieces of reference detection algorithm information and one or more reference photographing conditions as the reference detection algorithm information are associated with the photographing condition to be searched using the second relevance index having three or more levels.

As illustrated in FIG. 17, the second relevance indexes are expressed as nodes 61a to 61e of so-called hidden layers as a set of combinations of one or more pieces of reference detection algorithm information and one or more reference photographing conditions. A weight for the reference detection algorithm information or the reference photographing condition and a weight for an output solution are set for each node 61a to 61e. This weight is the second relevance index having three or more levels. For example, the node 61a is associated with "880±5 nm, 970±10 nm, cluster analysis" as the reference detection algorithm information at a second relevance index of 80%, and is associated with "camera spectrum characteristic R1" as the reference photographing condition at a second relevance index of 80%. In addition, the node 61c is associated with "230±12 nm, 630±5 nm" as the reference detection algorithm information at a second relevance index of 60%, is associated with "image capturing element T, shutter speed XX seconds" as the reference photographing condition at a second relevance index of 60%, and is associated with "camera spectrum characteristic R2" as the reference photographing condition at a second relevance index of 40%.

In a case where the second relevance indexes are stored in advance, and the detection algorithm information searched in the first embodiment or the known photographing condition (the input detection algorithm information or reference photographing condition) is associated with "880±5 nm, 970±10 nm, cluster analysis" as the reference detection algorithm information and "shutter speed XX seconds" as the reference photographing condition, this case is associated with the node 61b using the second relevance indexes. In addition, this node 61b is associated with "filter R, illumination light angle XX°" at a second relevance index of 60%, and is associated with "exposure time shorter than XX ns" at a second relevance index of 40%. These conditions may be output as a search result.

Each of the second relevance index linked from this node 61 to the photographing condition to be searched and the second relevance index linked from the reference detection algorithm information or the reference photographing condition to the node 61 has three or more levels. However, any one of the second relevance index linked from the node 61 to the photographing condition to be searched and the second relevance index linked from the reference detection algorithm information or the reference photographing condition to the node 61 may have two levels, that is, may be configured depending on whether or not they are linked.

Similarly, this may apply to the first relevance index described above. That is, the combined relevance indexes may be linked to the nodes 61 provided between the input side (for example, the side where the reference detection algorithm information and the reference photographing condition are placed in FIG. 17) and the output side (for example, the side where the photographing condition to be searched is placed in FIG. 17). In addition, the first relevance indexes having three or more levels may be set independently to the nodes 61 from the input side and to the output side from the nodes 61, and each relevance index may be independently updated.

A user designs each of the imaging optical system 51, the filter 52, the image capturing element 53, the signal processing unit 54, and the like of the photographing apparatus 5 on the basis of the output photographing condition, sets the condition of the illumination light, or decides various conditions regarding the photographing. In particular, according to the present invention, it is possible to reduce a burden of labor for researching an optimum photographing condition for the photographing apparatus 5 and thus shorten time whenever a new target event of the subject is sequentially generated or whenever new detection algorithm information is created.

The information search system 1 according to the present invention is characterized in that an optimum photographing condition is searched using the second relevance index set in three or more levels. The second relevance index may be described, for example, using a numerical value 0 to 100%. However, the invention is not limited thereto. The second relevance index may be described in any number of levels as long as it can be described using a numeral value having three or more levels.

Since the search operation is performed on the basis of the second relevance index expressed as a numerical value having three or more levels in this manner, the photographing conditions may be searched and displayed in a descending order of the second relevance index when a plurality of photographing conditions are selected. If the photographing condition is displayed for a user in a descending order of the second relevance index, a user may be urged to select a photographing condition having a higher possibility with a higher priority. Meanwhile, even a photographing condition having a lower second relevance index may be displayed as a second opinion. This is useful when the design is not easy using the first opinion.

In addition, according to the present invention, it is possible to determine the photographing condition having a significantly low second relevance index such as 1% without missing. Therefore, it is possible to allow a user to pay attention to a fact that even a photographing condition having a significantly low second relevance index is linked as an insignificant indication and may be useful as the photographing condition once in several tens or hundreds of times.

According to the present invention, since the search operation is performed on the basis of the second relevance index having three or more levels in this manner, it is possible to select the search strategy by setting a threshold value advantageously. If the threshold value is set to be lower, it is possible to catch the photographing condition without missing even when the relevance index described above is 1%. However, a possibility of suitably detecting a photographing condition suitable for the detection algorithm information or the known photographing condition may decrease. In comparison, if the threshold value is set to be higher, it is possible to narrow the photographing condition suitable for the detection algorithm information or the known photographing condition with a high possibility. However, a photographing condition that may be suitable once in several tens or hundreds of times may be overlooked in some cases. Which one is emphasized may be decided from the viewpoint of a user side or a system side. However, it is possible to improve a degree of freedom for selecting such an emphasis point.

FIG. 18 illustrates an example in which a filter condition is defined as the reference photographing condition in the left side, and an image capturing element condition is defined as the photographing condition to be searched in the right side. In the example of FIG. 15 described above, the image capturing element condition is defined as the reference photographing condition in the left side, and the filter condition is defined as the photographing condition to be searched in the right side. That is, in FIG. 18, their locations are exchanged.

In the example of FIG. 18, the image capturing elements T, U, and W are included as the photographing condition to be searched therefrom, and the filter condition is decided as a filter S or a filter R before the search. Therefore, "filter S" and "filter R" are included as the reference photographing condition in the left side. It is possible to search an optimum image capturing element suitable for any condition of the filter S using the second relevance index of FIG. 18.

In this manner, according to the second embodiment, the second relevance index can be prepared in advance by classifying illumination light information, various parameters of the imaging system, and parameters of hardware into a photographing condition to be actually searched therefrom and a condition decided in advance. As a result, even when the photographing condition to be searched changes from time to time, it is possible to implement the search operation by creating a second relevance index in advance such that the photographing condition to be actually searched therefrom is placed in the right side.

According to the present invention, the second relevance index described above may be updated. That is, the reference detection algorithm information, the reference photographing condition, and the design information illustrated in FIG. 15 are updated as necessary. This updating may be performed to reflect information provided via a public communication network such as the Internet. When new knowledge about a relationship between the reference detection algorithm information, the reference photographing condition and the design information is found through site information or writings obtainable from the public communication network, the relevance index increases or decreases depending on the knowledge. For example, when a fact that a photographing condition having a certain level of the relevance index for certain detection algorithm information has high congeniality is cited many times via the sites of the public communication network, the second relevance index set therebetween further increases. In addition, when a fact that a photographing condition having a certain level of the second relevance index for certain detection algorithm information has bad congeniality is cited many times via the sites of the public communication network, the second relevance index set therebetween decreases. In addition, when a fact that certain detection algorithm information can be detected with high accuracy using a photographing condition that has not existed so far is cited via the sites of the public communication network, the updating may be performed by setting a new second relevance index therebetween.

The second relevance index may be updated on the basis of the information obtainable from the public communication network. In addition, the updating may be performed artificially or automatically by the system side or the user side on the basis of the contents of research data, papers, conference presentations, or the like by experts. Artificial intelligence may be utilized in this updating processing.

Note that, according to the present invention, the second embodiment may be executed successively following the first embodiment. In this case, first, a target event of a subject is input in the first embodiment, and optimum detection algorithm information or an optimum photographing condition suitable for the target event is selected by referencing the first relevance index. Then, the second relevance index is referenced on the basis of the selected detection algorithm information or photographing condition, so that an optimum photographing condition of the photographing apparatus 5 suitable for it is selected. That is, when the target event of the subject is input, an optimum photographing condition for photographing the subject using the photographing apparatus 5 is displayed as a solution of the search apparatus 2.

A data flow according to the second embodiment will be described with reference to FIG. 13. Various photographing conditions of the photographing apparatus 5 are decided on the basis of the detection algorithm information or the photographing condition searched in the first embodiment. As the photographing condition, one or more of parameters of hardware such as the imaging optical system 51, the filter 52, the image capturing element 53, and the signal processing unit 54 described above, parameters of the photographing system, and information of the illumination light are decided. The photographing apparatus 5 configured by reflecting these photographing conditions has a configuration suitable for detecting a target event of the subject to be detected from the detection algorithm information. In addition, it is possible to obtain a color analysis image subjected to computation by photographing a subject using the photographing apparatus 5 and performing characteristic wavelength computation.

Note that, according to the second embodiment, in particular, when the photographing apparatus 5 is implemented as any digital camera embedded in a mobile phone, a smart phone, a tablet terminal, or a wearable terminal, a filter condition of application software for obtaining the color analysis image or a filter computation method may also be included in the aforementioned photographing condition. The "filter condition" of the application software refers to a condition for specifically deciding a characteristic wavelength or a characteristic wavelength range of the imaging light to be transmitted using software. Similarly, the "filter computation" refers to an operation of deciding what kind of characteristic wavelength computation is performed specifically using software.

According to the present invention, the target event may be automatically determined from spectral data obtained by photographing a subject using the spectral image capturing device 4 or the photographing apparatus 5 on the basis of the searched detection algorithm information or photographing condition. In the case of this determination, the search apparatus 2 may have an automatic determination function.

Figure 19:
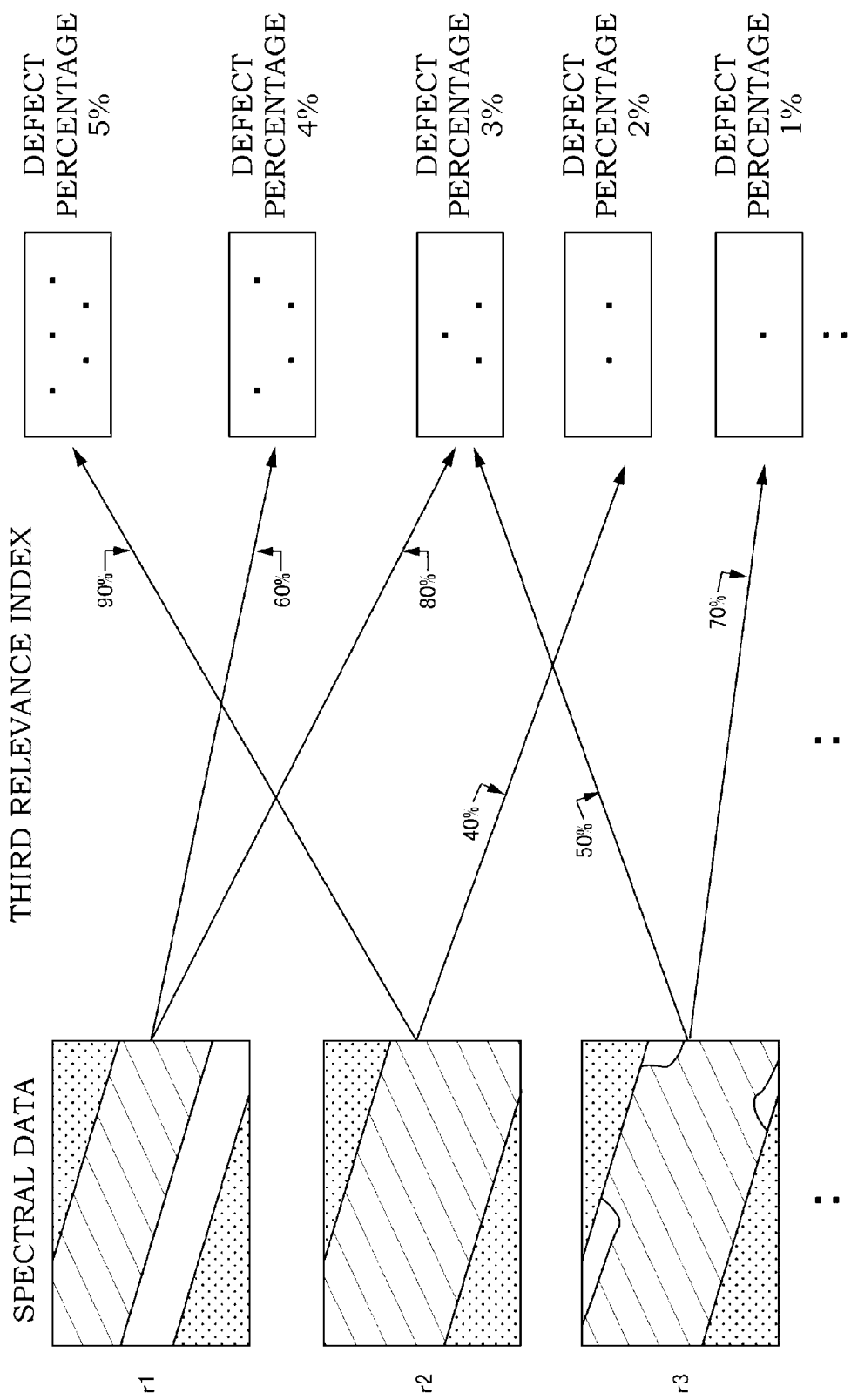
FIG. 19 is a diagram illustrating a third relevance index necessary for automatically determining the target event using spectral data.

FIG. 19 illustrates third relevance indexes necessary to automatically determine a target event using the spectral data. In this example of the third relevance index, spectral data and a target event determination result obtained by photographing a subject using the spectral image capturing device 4 or the photographing apparatus 5 are subjected to learning in advance.

The algorithm database 3 stores third relevance indexes having three or more levels between the spectral data r1, r2, r3, . . . , and so on and the target event determination results as an output solution in advance. In the example of FIG. 19, in a case where the spectral data is "r1", "defect percentage of 3%" as a defect percentage of a defect generated on a surface of glass has a third relevance index of 80%, and "defect percentage of 4%" has a third relevance index of 60%. In addition, in a case where the spectral data is "r2", "defect percentage of 5%" has a relevance index of 90%, and "defect percentage of 2%" has a relevance index of 40%.

The third relevance index may be set on the basis of the spectral data r1, r2, r3, . . . and so on obtained by photographing a subject using the spectral image capturing device 4 or the photographing apparatus 5 and defect percentages as determination results thereof accumulated in the algorithm database 3 in advance. The third relevance index may be obtained using a so-called neural network. The third relevance index represents accuracy of a determination result (such as the defect percentage described above) in actual determination of the target event of the subject based on the spectral data. For example, for the spectral data r3, "defect percentage of 1%" having a relevance index of 70% is close to the most accurate determination, and "defect percentage of 3%" having a relevance index of 50% is the next accurate determination. Similarly, for the spectral data r2, "defect percentage of 5%" having a relevance index of 90% is close to the most accurate determination, and "defect percentage of 2%" having a relevance index of 40% is the next accurate determination.

Then, new spectral data is acquired by actually photographing glass as a subject using the spectral image capturing device 4 or the photographing apparatus 5 on the basis of the searched algorithm. A work for determining a target event of the subject is performed on the basis of the acquired spectral data. In this determination, a third relevance index of FIG. 19 acquired in advance is referenced. If the newly acquired spectral data is the spectral data r1 or data close thereto, "defect percentage of 3%" having the highest third relevance index is selected as an optimum solution by referencing the third relevance indexes described above. However, it is not indispensable to select the one having the highest third relevance index as the optimum solution. Instead, "defect percentage of 4%" which has a low third relevance index but still has relevance itself may be selected as the optimum solution. Naturally, any other output solution not linked with the arrow may also be selected as the output solution. That is, selection of the determination result for the target event of the subject is not limited to a descending order case in which a determination result having the higher third relevance index is selected with a higher priority. Instead, a determination result may be selected in an ascending order from the lower third relevance index. Alternatively, any other selection method based on a priority may also be employed.

In a case where the obtained spectral data is partially similar to the spectral data r2 and also partially similar to the spectral data r3, and it is difficult to know which one the result is allocated to, the determination may be performed by focusing on, for example, a characteristic between images or the like. In this case, for example, which one the result is allocated to may be determined by regarding the luminance of the spectral data as a characteristic region of the image. In order to determine which one of spectral data r1 to r3 the image of the acquired spectral data is similar to, for example, deep learning or the like may be utilized. Which one of spectral data r1 to r3 the result is allocated to is determined on the basis of the characteristic amount of the image through the deep learning. Then, the obtained spectral data is allocated to any one of r1 to r3, and a determination result of the target event of the subject is selected as an output solution on the basis of the third relevance index set thereby.

Note that a method of selecting the determination result of the target event of the subject for the acquired spectral data is not limited to the aforementioned one, but any method may be employed as long as the third relevance index is referenced. In addition, artificial intelligence may also be employed to perform such a search operation.

Figure 20:
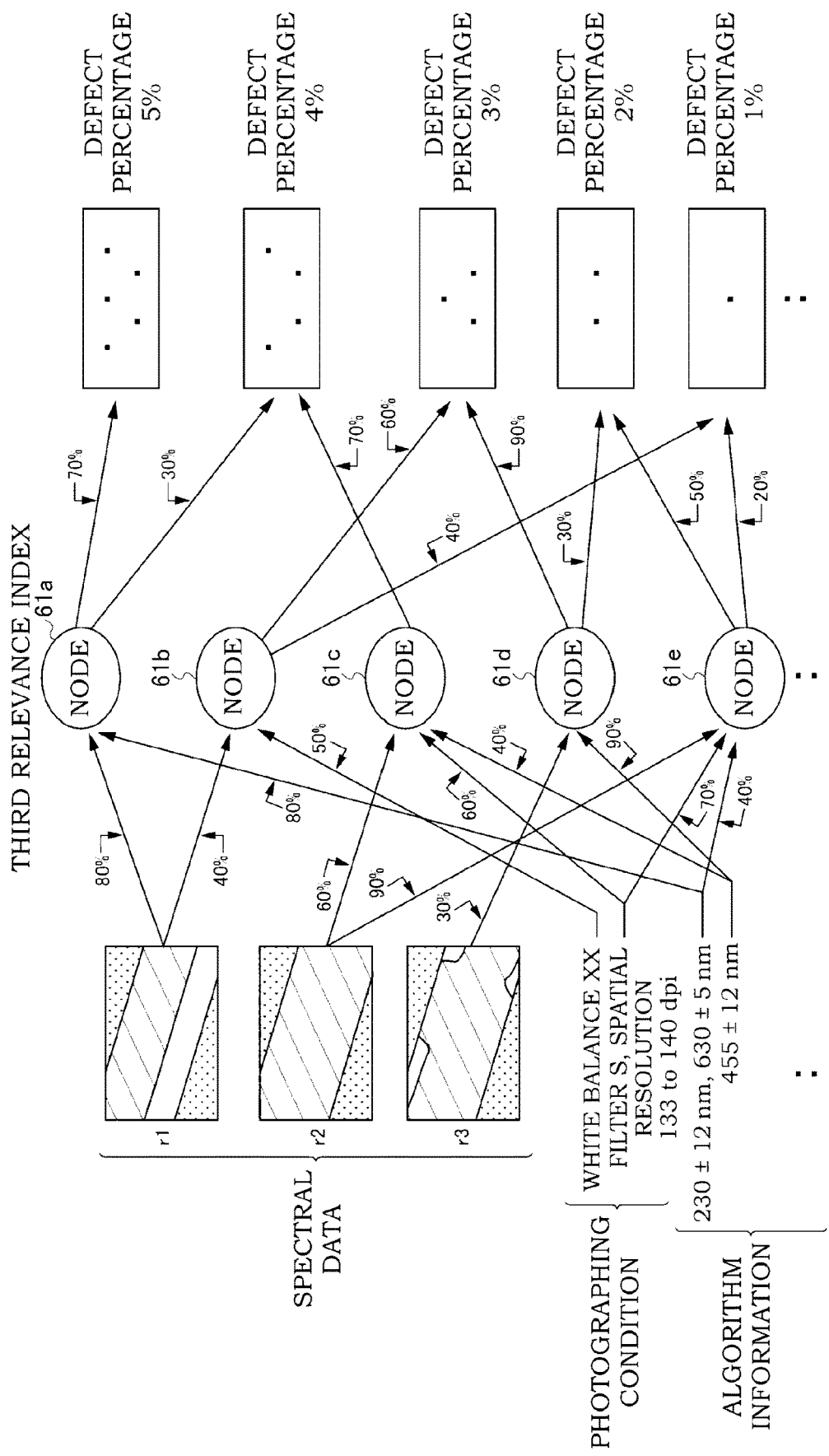
FIG. 20 is a diagram illustrating a third relevance index having three or more levels between a combination and a determination result of the target event of the subject.

FIG. 20 illustrates an example in which third relevance index having three or more levels is set between a combination of the reference spectral data r1, r2, . . . , and so on and the reference detection algorithm information and/or reference photographing condition and the determination result of the target event of the subject for this combination.

In this case, the third relevance indexes are expressed as nodes 61a to 61e of so-called hidden layers as a set of combinations of the reference spectral data r1, r2, . . . , and so on and the reference detection algorithm information and/or reference photographing condition as illustrated in FIG. 20. A weight for the reference spectral data r1, r2, . . . , and so on and the reference detection algorithm information and/or reference photographing condition and a weight for the determination result of the target event of the subject are set for each node 61a to 61e. These weights are the third relevance indexes having three or more levels. For example, the node 61a is associated with spectral data r1 at a third relevance index of 80%, and is associated with "230±12 nm, 630±5 nm" as algorithm information at a third relevance index of 80%. In addition, the node 61c is associated with spectral data r2 at a third relevance index of 60%, is associated with "filter S, spatial resolution" as the reference photographing condition at a third relevance index of 60%, and is associated with "455±12 nm" as the reference detection algorithm information at a third relevance index of 40%.

Similarly, even in a case where the third relevance index is set in this manner, when the spectral data is newly acquired, and the photographing condition and/or detection algorithm information are newly acquired, a determination result of the target event of the subject is searched by referencing the third relevance index. In a case where the newly acquired spectral data is "r1", and the photographing condition is set to "white balance XX", this case is associated with the node 61b using the third relevance index, and the node 61b is associated with "defect percentage of 3%" at a third relevance index of 60% and is associated with "defect percentage of 1%" at a third relevance index of 40%. The determination result of the target event of the subject is selected on the basis of the third relevance index described above.

The present invention may be implemented as a design information search system. In the design information search system, design information for designing the target event is searched on the basis of the determination result of the target event. The design information may be searched by referencing, for example, a fourth relevance index as described below.

Here, the design information of the target event includes all types of information necessary for designing the target event in the future. For example, in a case where a facial moisture percentage is 70% as a determination result of the target event, information necessary for designing a foundation suitable for it is searched. Alternatively, in a case where the determination result of the target event is a defect percentage of glass, information necessary for newly designing a material of glass is searched. The information necessary for this material design may include, for example, an advice telling that a material P is formed in the first layer, a material Q is formed in the second layer, a dispersion reinforcing fiber is compounded, and a material R is formed in the third layer.

Figure 21:
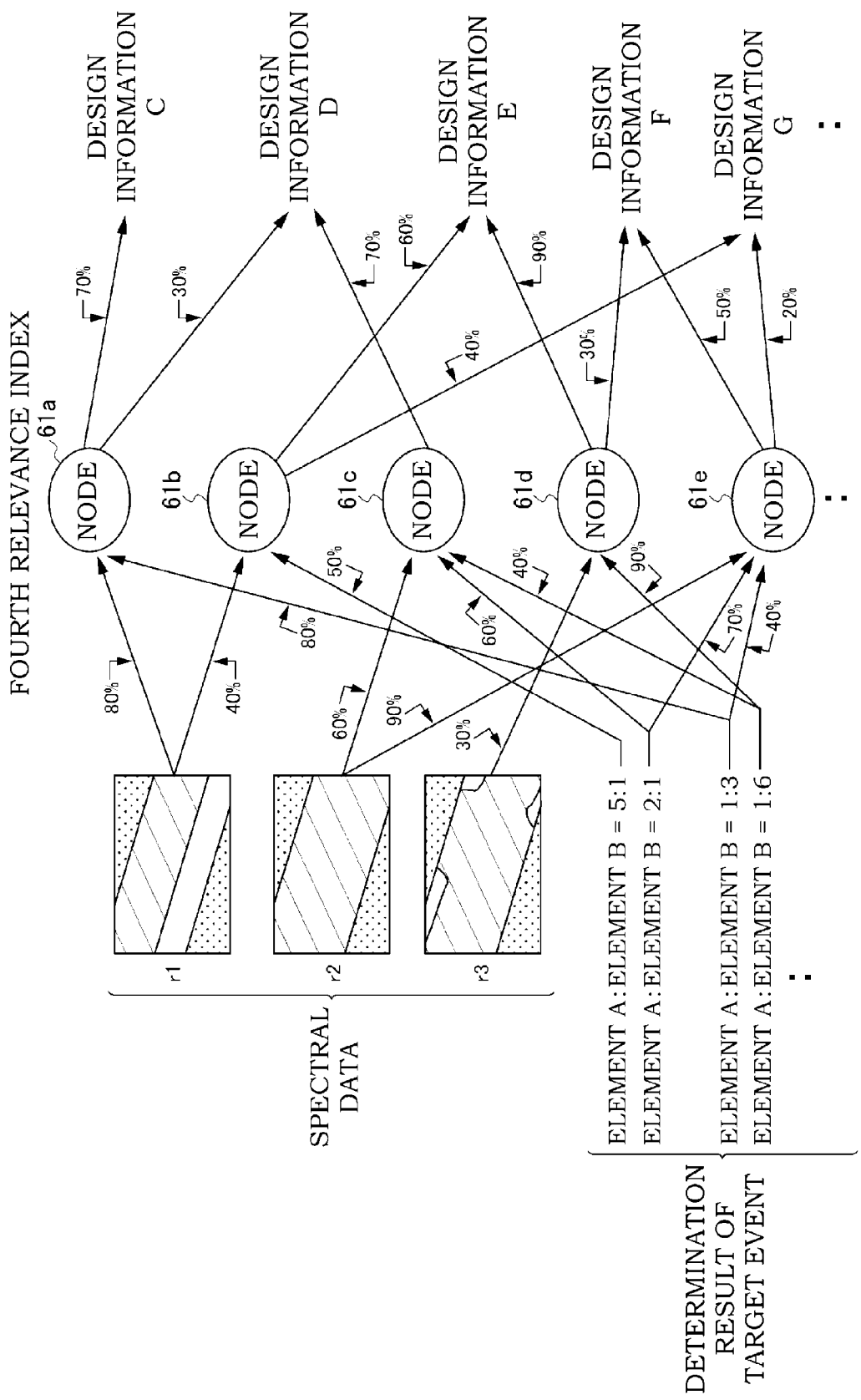
FIG. 21 is a diagram illustrating an example in which a fourth relevance index having three or more levels is set with design information to be searched.

FIG. 21 illustrates an example in which a fourth relevance index having three or more levels is set between a combination of reference spectral data r1, r2, . . . , and so on and a determination result of the reference target event and design information to be searched.

In this case, the fourth relevance indexes are expressed as nodes 61a to 61e of so-called hidden layers as a set of combinations of the reference spectral data r1, r2, . . . , and so on and the determination result of the reference target event as illustrated in FIG. 21. A weight for the reference spectral data r1, r2, . . . , and so on and the determination result of the reference target event and a weight for the design information to be searched are set to each node 61a to 61e. These weights are the fourth relevance indexes having three or more levels. For example, the node 61a is associated with spectral data r1 at a third relevance index of 80% and is associated with "element A:element B=1:3" as a determination result of the target event at a fourth relevance index of 80%. In addition, the node 61c is associated with the spectral data r2 at a fourth relevance index of 60%, is associated with "element A:element B=2:1" as a determination result of the target event at a fourth relevance index of 60%, and is associated with "element A:element B=1:6" as a determination result of the target event at a fourth relevance index of 40%.

Similarly, even in a case where the fourth relevance index is set in this manner, when the spectral data is newly acquired, the determination result of the target event is newly acquired, the design information is searched by referencing the fourth relevance index. In a case where the newly acquired spectral data is "r1", and the determination result of the target event is "element A:element B=5:1", this case is associated with the node 61b using the fourth relevance index, and the node 61b is associated with "design information E" at a fourth relevance index of 60%, and is associated with "design information G" at a fourth relevance index of 40%. The design information is selected on the basis of the fourth relevance index described above.

Alternatively, the determination result of the target event may be selected using the third relevance index. Alternatively, the one newly input separately from the target event may also be used.

The determination using the third and fourth relevance indexes may be performed by combining one or more pieces of location information regarding a location where the subject 10 is photographed, map information obtained by comparing this location information to a map of the current position, and form information of the subject 10 (such as shape, pattern, color, and texture). In this case, a position information acquisition unit (not shown) for acquiring the current position information in real time on the basis of a satellite positioning signal transmitted from an artificial satellite, or a map information acquisition unit (not shown) for storing map information including maps in Japan, maps of various countries in the world is provided separately. The form information is acquired using the camera that photographs the subject 10. It is possible to identify the form (such as shape, pattern, color, and texture) of the subject 10 from the image of the subject 10 photographed by the camera. One or more pieces of the detected location information, map information, and form information are acquired, and a learning model using the third or fourth relevance index is built as described above. In this case, one or more pieces of the location information, the map information, and the form information are arranged in the left side of the node 61 of the third relevance index in FIG. 20 or in the left side of the node 61 of the fourth relevance index in FIG. 21, and are linked to the node 61. That is, the third and fourth relevance indexes are models by which determination can be performed by combining one or more pieces of the location information, the map information, and the form information. Therefore, it is possible to determine various events using the third and fourth relevance indexes described above by combining one or more pieces of the location information, the map information, and the form information.

Note that the form information may include so-called spatial characteristic information. Here, the "spatial characteristic information" includes a spatial location (arrangement), a form (such as shape, size, pattern, color, and texture), or the like. This spatial characteristic information is a concept including the characteristic amount on the image used in a so-called deep learning technology and is information for identifying a spatial location (arrangement) or a form by extracting it. This spatial characteristic information may also include a spectral characteristic amount extracted on a spectrum basis as well as a typical spatial characteristic amount. Alternatively, the spatial characteristic information may be formed by combining the spatial characteristic amount and the spectral characteristic amount. Since the spectral characteristic amount is obtained by extracting the characteristic amount on the basis of the spectral image, it is possible to easily separate a desired subject from a background movement and extract the characteristic amount. Therefore, it is possible to easily recognize the form information.

Artificial intelligence such as a neural network may also be employed in both the third and fourth relevance indexes.

REFERENCE SIGNS LIST 1 information search system
2 search apparatus
3 algorithm database
4 spectral image capturing device
5 photographing apparatus
6 photographing condition database
10 subject
21 internal bus
23 display unit
24 control unit
25 manipulation unit
26 communication unit
27 search unit
28 memory unit
41 objective lens
42 precise linear motion stage
43 slit plate
43a slit opening
44 collimator lens
45 dispersive optical element
46 imaging lens
47 image capturing element
48 control unit
51 imaging optical system
52 filter
53 image capturing element
54 signal processing unit
481 photographing control unit
482 movement control unit
483 spectral data creation unit
484 image processing unit
484-1 correction processing unit
484-2 calculation unit 484-3 color analysis image acquisition unit

DRAWINGS

[FIG. 1]
3 ALGORITHM DATABASE
2 SEARCH APPARATUS
4 SPECTRAL IMAGE CAPTURING DEVICE

[FIG. 2]
27 SEARCH UNIT
28 MEMORY UNIT
23 DISPLAY UNIT
21 INTERNAL BUS
24 CONTROL UNIT
25 MANIPULATION UNIT
26 COMMUNICATION UNIT

[FIG. 3]
42 PRECISE LINEAR MOTION STAGE
48 CONTROL UNIT

[FIG. 4]
48 CONTROL UNIT
481 PHOTOGRAPHING CONTROL UNIT
482 MOVEMENT CONTROL UNIT
483 SPECTRAL DATA CREATION UNIT
484 IMAGE PROCESSING UNIT
484-1 CORRECTION PROCESSING UNIT
484-2 CALCULATION UNIT
484-3 COLOR ANALYSIS IMAGE ACQUISITION UNIT

[FIG. 5]
FOCAL POINT CONTROL
54 SIGNAL PROCESSING

[FIG. 6]
START
S11 INPUT TARGET EVENT OF SUBJECT
S12 TEXT ANALYSIS FOR TARGET EVENT OF SUBJECT
S13 SEARCH DETECTION ALGORITHM INFORMATION
S14 DISPLAY
END

[FIG. 7]
SPECTRAL INTENSITY
FOR ONE DAY
FOR THREE DAYS
FOR FIVE DAYS
WAVELENGTH

[FIG. 8]
REFERENCE TARGET EVENT OF SUBJECT
FRESHNESS OF FRUIT
MOISTURE OF HAIR
SALT IN MIXTURE
PHOTOSYNTHESIS OF LEAF
STOMACH CANCER
DEFECT OF GLASS
FIRST RELEVANCE INDEX
DETECTION ALGORITHM INFORMATION
CHARACTERISTIC WAVELENGTH
COMPUTATION METHOD
LINEAR
CLUSTER ANALYSIS
PLS REGRESSION
WEIGHTED AVERAGING

[FIG. 9]
SUBJECT
GLASS
PLASTIC
METAL
RESIN
SUGAR
SALT
CERAMIC-BASED COMPOSITE MATERIAL
METAL
FOREIGN SUBSTANCE
GLASS
PLASTIC
CERAMICS
REFERENCE TARGET EVENT
DEFECT
DIRT
SALT
CRACK
FOREIGN SUBSTANCE
DEPOSIT
FIRST RELEVANCE INDEX
DETECTION ALGORITHM INFORMATION
CHARACTERISTIC WAVELENGTH
COMPUTATION METHOD
LINEAR
CLUSTER ANALYSIS
PLS REGRESSION
WEIGHTED AVERAGING

[FIG. 10]
REFERENCE TARGET EVENT OF SUBJECT
FRESHNESS OF FRUIT
MOISTURE OF HAIR
PHOTOSYNTHESIS OF LEAF
STOMACH CANCER
DEFECT OF GLASS
FIRST RELEVANCE INDEX
PHOTOGRAPHING CONDITION
WHITE BALANCE XX
LENS ARRANGEMENT P, FILTER W
FILTER Q
FILTER R, ILLUMINATION LIGHT ANGLE XX°
FILTER S, SPATIAL RESOLUTION 133 to 140 dpi
EXPOSURE TIME OF XX ns OR LONGER
EXPOSURE TIME SHORTER THAN XX ns

[FIG. 11]
FRESHNESS OF FRUIT
FILTER S
SHUTTER SPEED XX seconds
PHOTOSYNTHESIS OF LEAF
DEFECT OF GLASS
ILLUMINATION LIGHT ANGLE XX°
PHOTOGRAPHING CONDITION
WHITE BALANCE XX
LENS ARRANGEMENT P
FILTER Q
FILTER R, ILLUMINATION LIGHT ANGLE XX°
FILTER S, SPATIAL RESOLUTION 133 to 140 dpi
EXPOSURE TIME OF XX ns OR LONGER
EXPOSURE TIME SHORTER THAN XX ns

[FIG. 12]
FRESHNESS OF FRUIT
PHOTOSYNTHESIS OF LEAF
ILLUMINATION LIGHT ANGLE
0 to 30°
30 to 60°
60 to 90°
SPATIAL RESOLUTION
96 to 120 dpi
120 to 144 dpi
144 to 192 dpi FIRST RELEVANCE INDEX
CLUSTER ANALYSIS
IMAGE CAPTURING ELEMENT T
ILLUMINATION LIGHT ANGLE XX°
FILTER R
[FIG. 13]
 INPUT INFORMATION
 INFORMATION ON ILLUMINATION LIGHT
 WAVELENGTH
 IRRADIATION ANGLE
 LUMINANCE
 etc.
 TARGET EVENT OF SUBJECT
 PARAMETER OF IMAGING SYSTEM
 WAVELENGTH RANGE
 WAVELENGTH RESOLUTION
 SPATIAL RESOLUTION
 SPECTRAL WAVELENGTH SENSITIVITY
 PARAMETER OF HARDWARE
 DETECTION ALGORITHM INFORMATION
 CHARACTERISTIC WAVELENGTH
 CHARACTERISTIC WAVELENGTH RANGE
 CHARACTERISTIC WAVELENGTH COMPUTATION
 SPECTRAL IMAGE CAPTURING DEVICE
 COLOR ANALYSIS IMAGE
 PHOTOGRAPHING CONDITION
 INFORMATION ON ILLUMINATION LIGHT
 PHOTOGRAPHING APPARATUS
 PARAMETER OF IMAGING SYSTEM
 IMAGING OPTICAL SYSTEM
 FILTER
 IMAGE CAPTURING ELEMENT
 SIGNAL PROCESSING UNIT
 CHARACTERISTIC WAVELENGTH COMPUTATION
 COLOR ANALYSIS IMAGE
[FIG. 14]
 ALGORITHM DATABASE
 SEARCH APPARATUS
 4 SPECTRAL IMAGE CAPTURING DEVICE
 6 PHOTOGRAPHING CONDITION DATABASE
 5 PHOTOGRAPHING APPARATUS
[FIG. 15]
 REFERENCE DETECTION ALGORITHM INFORMATION
 REFERENCE PHOTOGRAPHING CONDITION
 CLUSTER ANALYSIS
 PLS REGRESSION
 SHUTTER SPEED XX seconds
 IMAGE CAPTURING ELEMENT T
 SHUTTER SPEED XX seconds
 SECOND RELEVANCE INDEX
 PHOTOGRAPHING CONDITION TO BE SEARCHED
 WHITE BALANCE XX
 LENS ARRANGEMENT P, FILTER W
 FILTER Q
 FILTER R, ILLUMINATION LIGHT ANGLE XX°
 FILTER S, SPATIAL RESOLUTION 133 to 140 dpi
 EXPOSURE TIME OF XX ns OR LONGER
 EXPOSURE TIME SHORTER THAN XX ns
[FIG. 16]
 REFERENCE DETECTION ALGORITHM INFORMATION
 REFERENCE PHOTOGRAPHING CONDITION
 CLUSTER ANALYSIS
 PLS REGRESSION
 SHUTTER SPEED XX seconds
 IMAGE CAPTURING ELEMENT T
 SHUTTER SPEED XX seconds
 SECOND RELEVANCE INDEX
 PHOTOGRAPHING CONDITION TO BE SEARCHED
 WHITE BALANCE XX
 LENS ARRANGEMENT P, FILTER W
 FILTER Q
 FILTER R, ILLUMINATION LIGHT ANGLE XX°
 FILTER S, SPATIAL RESOLUTION 133 to 140 dpi
 EXPOSURE TIME OF XX ns OR LONGER
 EXPOSURE TIME SHORTER THAN XX ns
[FIG. 17]
 REFERENCE DETECTION ALGORITHM INFORMATION
 REFERENCE PHOTOGRAPHING CONDITION
 CLUSTER ANALYSIS
 SHUTTER SPEED XX seconds
 IMAGE CAPTURING ELEMENT T
 SHUTTER SPEED XX seconds
 CAMERA SPECTRUM CHARACTERISTIC R1
 CAMERA SPECTRUM CHARACTERISTIC R2
 SECOND RELEVANCE INDEX
 NODE
 NODE
 NODE
 NODE
 NODE
 PHOTOGRAPHING CONDITION TO BE SEARCHED
 WHITE BALANCE XX
 LENS ARRANGEMENT P, FILTER W
 FILTER R, ILLUMINATION LIGHT ANGLE XX°
 FILTER S, SPATIAL RESOLUTION 133 to 140 dpi
 EXPOSURE TIME SHORTER THAN XX ns
[FIG. 18]
 REFERENCE DETECTION ALGORITHM INFORMATION
 REFERENCE PHOTOGRAPHING CONDITION
 CLUSTER ANALYSIS
 PLS REGRESSION
 SHUTTER SPEED XX seconds
 FILTER S
 SHUTTER SPEED XX seconds
 FILTER R
 SECOND RELEVANCE INDEX
 PHOTOGRAPHING CONDITION TO BE SEARCHED
 WHITE BALANCE XX
 LENS ARRANGEMENT P, FILTER W
 IMAGE CAPTURING ELEMENT T
 IMAGE CAPTURING ELEMENT U, ILLUMINATION LIGHT ANGLE XX°
 IMAGE CAPTURING ELEMENT W, SPATIAL RESOLUTION 133 to 140 dpi
 EXPOSURE TIME OF XX ns OR LONGER
 EXPOSURE TIME SHORTER THAN XX ns
[FIG. 19]
 SPECTRAL DATA
 THIRD RELEVANCE INDEX
 DEFECT PERCENTAGE
 DEFECT PERCENTAGE
 DEFECT PERCENTAGE
 DEFECT PERCENTAGE
 DEFECT PERCENTAGE
[FIG. 20]
 SPECTRAL DATA
 PHOTOGRAPHING CONDITION
 WHITE BALANCE XX
 FILTER S, SPATIAL RESOLUTION 133 to 140 dpi
 ALGORITHM INFORMATION THIRD RELEVANCE INDEX
NODE
NODE
NODE
NODE
NODE
DEFECT PERCENTAGE
DEFECT PERCENTAGE
DEFECT PERCENTAGE
DEFECT PERCENTAGE
DEFECT PERCENTAGE
[FIG. 21]
SPECTRAL DATA
DETERMINATION RESULT OF TARGET EVENT
ELEMENT A:ELEMENT B
ELEMENT A:ELEMENT B
ELEMENT A:ELEMENT B
ELEMENT A:ELEMENT B
FOURTH RELEVANCE INDEX
NODE
NODE
NODE
NODE
NODE
DESIGN INFORMATION C
DESIGN INFORMATION D
DESIGN INFORMATION E
DESIGN INFORMATION F
DESIGN INFORMATION G

The invention claimed is:

1. An information search system for searching detection algorithm information of spectral data necessary for determining a target event from a photographed subject, the information search system comprising:
a first relational database configured to store, in advance, a first relevance index having at least three levels between each target event of the subject and the detection algorithm information;
a target event input unit configured to receive input information containing text data regarding a target event of the subject to be newly determined by a user;
a search unit configured to search detection algorithm information associated at a higher relevance index based on a first relevance index having at least three levels between a reference target event corresponding to information regarding the target event received by the target event input unit and the detection algorithm information by referencing the first relevance index stored in the first relational database; and
a display unit configured to display the detection algorithm information searched by the search unit to a user.

2. The information search system according to claim 1, further comprising:
a photographing unit configured to create, using the detection algorithm information searched by the search unit, a spectral image representing reflectance or transmittance of the subject for each wavelength based on three-dimensional spectral data having two-dimensional spatial information and one-dimensional wavelength information from two-dimensional spectral data, obtained by photographing the subject; and
a target event determination unit configured to determine a target event based on the spectral image created by the photographing unit.

3. The information search system according to claim 1, wherein the first relational database stores, in advance, the first relevance index having at least three levels between each target event of the subject and the detection algorithm information for specifying a wavelength range in which the target event can be identified as a characteristic wavelength and specifying a plurality of the characteristic wavelengths.

4. The information search system according to claim 1, wherein:
the first relational database stores, in advance, a first relevance index having at least three levels between a combination of each target event of the subject and a reference photographing condition and a combination of the detection algorithm information and a photographing condition,
the target event input unit receives information regarding a target event of the subject to be newly determined and a known photographing condition,
the search unit searches a combination of at least one piece of the detection algorithm information and the photographing condition based on information regarding the target event received by the target event input unit and the known photographing condition by referencing the first relevance index stored in the first relational database, and
the information search system further comprises a photographing unit that is configured to perform photographing based on a condition for photographing determined based on the photographing condition searched by the search unit.

5. The information search system according to claim 4, wherein:
the photographing unit has an imaging optical system that condenses light from the subject to form an image on an image plane of an image capturing element, and a filter arranged in the middle of an optical path to the image capturing element to transmit only light belonging to a predetermined wavelength region and reflect light of other wavelength regions,
the first relational database stores, in advance, the first relevance index having at least three levels between the combination of each target event of the subject and a reference photographing condition and the combination of the detection algorithm information and a photographing condition, the photographing condition including a transmission wavelength of the filter,
the photographing unit is configured to sequentially switch a plurality of filters having different transmission wavelength regions based on the photographing condition including the transmission wavelength of the filter searched by the search unit.

6. An information search system for searching a photographing condition of a photographing apparatus for determining a target event from a photographed subject, the information search system comprising:
a first relational database configured to store, in advance, a first relevance index having at least three levels between each reference target event of the subject and each photographing condition;
a target event input unit configured to receive information regarding a target event of the subject to be newly determined; and
a search unit configured to search a photographing condition associated at a higher relevance index based on a first relevance index having at least three levels between a reference target event corresponding to information regarding the target event received by the target event input unit and each photographing condition by referencing the first relevance index stored in the first relational database.

7. The information search system according to claim 6, further comprising:
a photographing unit configured to create, using the photographing condition searched by the search unit, a spectral image representing reflectance or transmittance of the subject for each wavelength based on three-dimensional spectral data having two-dimensional spatial information and one-dimensional wavelength information from two-dimensional spectral data, obtained by photographing the subject; and
a target event determination unit configured to determine a target event based on the spectral image created by photographing unit.

8. The information search system according to claim 7, wherein:
the first relational database stores, in advance, the first relevance index having at least three levels between each target event and reference photographing condition of the subject and each photographing condition,
the target event input unit receives information regarding a target event of the subject to be newly determined and a known photographing condition, and
the search unit searches at least one photographing condition based on information regarding the target event received by the target event input unit and the known photographing condition by referencing the first relevance index stored in the first relational database.

9. The information search system according to claim 1, further comprising a second relational database that stores, in advance, a second relevance index having at least three levels between each piece of the detection algorithm information and a photographing condition to be searched for a photographing apparatus for determining a target event from the photographed subject,
wherein the search unit searches the at least one photographing condition to be searched based on at least one piece of the searched detection algorithm information or at least one piece of newly input detection algorithm information by referencing the second relevance index stored in the second relational database.

10. The information search system according to claim 9, wherein:
the second relational database stores, in advance, the second relevance index having at least three levels between a plurality of combinations of detection algorithm information and the photographing condition to be searched, and
the search unit searches the at least one photographing condition to be searched based on the plurality of pieces of searched detection algorithm information or a plurality of pieces of newly input detection algorithm information by referencing the second relevance index stored in the second relational database.

11. The information search system according to claim 9, wherein:
the second relational database stores, in advance, the second relevance index having at least three levels between a combination of each piece of the detection algorithm information and the reference photographing condition and the photographing condition to be searched, and
the search unit searches at least one photographing condition to be searched based on at least one piece of the searched detection algorithm information or at least one piece of newly input detection algorithm information and information regarding the known photographing condition by referencing the second relevance index stored in the second relational database.

12. The information search system according to claim 1, further comprising:
a photographing unit configured to photograph the subject based on the detection algorithm information searched by the search unit;
a target event determination unit configured to determine a target event based on spectral data obtained by photographing the subject by the photographing unit; and
a third relational database that stores, in advance, a third relevance index having at least three levels between reference spectral data and a determination result of the target event of the subject,
wherein the target event determination unit performs determination by searching at least one of the determination results based on the spectral data obtained by photographing by the photographing unit by referencing the third relevance index stored in the third relational database.

13. The information search system according to claim 1, further comprising:
a photographing unit configured to photograph the subject based on the detection algorithm information searched by the search unit;
a target event determination unit configured to determine a target event based on spectral data obtained by photographing the subject by the photographing unit; and
a third relational database that stores, in advance, a third relevance index having at least three levels between (i) a combination of reference spectral data and at least one of reference detection algorithm information and a reference photographing condition and (ii) a determination result of the target event of the subject, and
the target event determination unit performs determination by searching at least one of the determination results based on the spectral data obtained by photographing by the photographing unit and said at least one of the detection algorithm information and the photographing condition included in the combination by referencing the third relevance index stored in the third relational database.

14. A design information search system comprising:
the information search system according to claim 12; and
a design information search unit configured to search design information for designing a target event based on a determination result of a target event by the target event determination unit in the information search system.

15. A design information search system comprising:
the information search system according to claim 13; and
a design information search unit configured to search design information for designing a target event based on a determination result of a target event by the target event determination unit in the information search system.

16. The design information search system according to claim 14, further comprising a fourth relational database configured to store, in advance, a fourth relevance index having at least three levels between (i) a combination of reference spectral data and a determination result of the target event of the subject and (ii) the design information,
wherein the design information search unit performs determination by searching at least one of the determination results based on spectral data obtained by photographing the subject by the photographing unit and the determination result of the target event by the target event determination unit by referencing the fourth relevance index stored in the fourth relational database.

17. The design information search system according to claim 14, further comprising a fourth relational database configured to store, in advance, a fourth relevance index having at least three levels between (i) a combination of reference spectral data, a determination result of the target event of the subject, and form information of the subject, and (ii) the design information,
wherein the design information search unit performs determination by searching at least one of the determination results based on the spectral data obtained by photographing by the photographing unit, the determination result of the target event by the target event determination unit, and a form of the subject identified from the photographed image of the subject, by referencing the fourth relevance index stored in the fourth relational database.

18. The design information search system according to claim 14, further comprising a fourth relational database that is configured to store, in advance, a fourth relevance index having at least three levels between (i) a combination of form information of the subject including spatial characteristic information formed by combining a spatial characteristic amount and a spectral characteristic amount, and (ii) the design information,
wherein the design information search unit performs determination by searching at least one of the determination results based on the form of the subject identified from the spatial characteristic information formed by combining the spatial characteristic amount and the spectral characteristic amount extracted from the photographed image of the subject.

19. The information search system according to claim 1, wherein the search unit performs the search using artificial intelligence.

20. A non-transitory recording medium having stored thereon an information search program for searching detection algorithm information necessary for determining a target event from a photographed subject, the information search program causing a computer to execute:
a target event input step of receiving information input regarding a target event of a subject to be newly determined; and
a search step of searching detection algorithm information associated at a higher relevance index based on a first relevance index having at least three levels between a reference target event corresponding to information regarding the target event input through the target event input step and the detection algorithm information by referencing a first relevance index having at least three levels between each reference target event of the subject and the detection algorithm information stored in a first relational database.

21. A non-transitory recording medium having stored thereon an information search program for searching a photographing condition of a photographing apparatus for determining a target event from a photographed subject, the information search program causing a computer to execute:
a target event input step of receiving input information regarding a target event of a subject to be newly determined; and
a search step of searching a photographing condition associated at a higher relevance index based on a first relevance index having at least three levels between a reference target event corresponding to information regarding the target event input through the target event input step and each photographing condition by referencing a first relevance index having at least three levels between each reference target event and each photographing condition of the subject, stored in a first relational database.

22. An information search method for searching detection algorithm information necessary for determining a target event from a photographed subject, the information search method comprising:
a target event input step of receiving input information regarding a target event of a subject to be newly determined; and
a search step of searching detection algorithm information associated at a higher relevance index based on a first relevance index having at least three levels between a reference target event corresponding to information regarding the target event input through the target event input step and the detection algorithm information by referencing a first relevance index having at least three levels between each reference target event of the subject and the detection algorithm information, stored in a first relational database.

23. An information search method for searching a photographing condition of a photographing apparatus for determining a target event from a photographed subject, the information search method comprising:
a target event input step of receiving input information regarding a target event of a subject to be newly determined; and
a search step of searching a photographing condition associated at a higher relevance index based on a first relevance index having at least three levels between a reference target event corresponding to information regarding the target event input through the target event input step and each photographing condition by referencing a first relevance index having at least three levels between each reference target event and each photographing condition of the subject, stored in a first relational database.

* * * * *